(12) United States Patent
Takemori et al.

(10) Patent No.: US 10,681,540 B2
(45) Date of Patent: Jun. 9, 2020

(54) COMMUNICATION NETWORK SYSTEM, TRANSMISSION NODE, RECEPTION NODE, AND MESSAGE CHECKING METHOD

(71) Applicant: KDDI CORPORATION, Tokyo (JP)

(72) Inventors: Keisuke Takemori, Tokyo (JP); Hideaki Kawabata, Tokyo (JP)

(73) Assignee: KDDI CORPORATION, Tokyo (JP)

( * ) Notice: Subject to any disclaimer, the term of this patent is extended or adjusted under 35 U.S.C. 154(b) by 239 days.

(21) Appl. No.: 15/315,084

(22) PCT Filed: Jun. 5, 2015

(86) PCT No.: PCT/JP2015/066344
§ 371 (c)(1),
(2) Date: Nov. 30, 2016

(87) PCT Pub. No.: WO2015/186825
PCT Pub. Date: Dec. 10, 2015

(65) Prior Publication Data
US 2017/0195878 A1    Jul. 6, 2017

(30) Foreign Application Priority Data

Jun. 5, 2014 (JP) .................................. 2014-116917
Apr. 23, 2015 (JP) .................................. 2015-088397

(51) Int. Cl.
*H04L 9/12*    (2006.01)
*H04W 12/04*    (2009.01)
(Continued)

(52) U.S. Cl.
CPC ........... *H04W 12/04* (2013.01); *B60R 16/023* (2013.01); *H04L 9/12* (2013.01); *H04L 9/3242* (2013.01);
(Continued)

(58) Field of Classification Search
CPC ..................................................... H04L 63/06
See application file for complete search history.

(56) References Cited

U.S. PATENT DOCUMENTS

2004/0255199 A1* 12/2004 Yamashita ............ G06F 21/629
714/37
2005/0010759 A1* 1/2005 Wakiyama .............. H04L 63/08
713/160

(Continued)

FOREIGN PATENT DOCUMENTS

CN    101815293 A    8/2010
JP    2005-167942    6/2005

(Continued)

OTHER PUBLICATIONS

Masato Hata et al., "How to Stop Unauthorized Transmission in Controller Area Network", Information Processing Society of Japan, Computer Security Symposium (CSS2011), pp. 624-629, Oct. 2011, and a corresponding partial English translation.

(Continued)

*Primary Examiner* — Moustafa M Meky
*Assistant Examiner* — Sm Z Islam
(74) *Attorney, Agent, or Firm* — Greenblum & Bernstein, P.L.C.

(57) ABSTRACT

In a communication network system connected between a transmission node and a reception node, both the transmission node and the reception node store the same secret information with their secret information storage units. The transmission node includes a counter configured to increase its transmission count value by 1 for transmitting each message, wherein a MAC generator generates MAC based on secret information, transmission data, and its transmission count value, thus transmitting a message including transmission data and MAC. The reception node includes a counter configured to increase a reception count value by 1

(Continued)

for receiving each message, wherein a MAC checking part generates MAC based on secret information, reception data, and its reception count value, obtained from the received message, thus checking whether the generated MAC matches the MAC obtained from the received message.

14 Claims, 21 Drawing Sheets

(51) Int. Cl.
    *B60R 16/023*     (2006.01)
    *H04L 9/32*     (2006.01)
    *H04L 29/06*     (2006.01)

(52) U.S. Cl.
    CPC .... *H04L 29/06027* (2013.01); *H04L 63/0428* (2013.01); *H04L 63/06* (2013.01); *H04L 2209/24* (2013.01); *H04L 2209/72* (2013.01); *H04L 2209/84* (2013.01)

(56) References Cited

U.S. PATENT DOCUMENTS

| | | | | |
|---|---|---|---|---|
| 2007/0245147 | A1* | 10/2007 | Okeya | H04L 9/0643 713/181 |
| 2008/0253569 | A1 | 10/2008 | Lim et al. | |
| 2010/0104094 | A1* | 4/2010 | Takashima | H04L 9/3073 380/28 |
| 2012/0057702 | A1 | 3/2012 | Minematsu | |
| 2012/0064892 | A1* | 3/2012 | Kim | H04W 8/26 455/435.1 |
| 2014/0064482 | A1* | 3/2014 | Sin | H04L 9/0891 380/44 |
| 2014/0310530 | A1* | 10/2014 | Oguma | H04L 9/3242 713/181 |
| 2017/0013006 | A1* | 1/2017 | Ujiie | H04L 12/6418 |

FOREIGN PATENT DOCUMENTS

| | | |
|---|---|---|
| JP | 2007-288514 | 11/2007 |
| JP | 2010-011400 | 1/2010 |
| JP | 2016-012912 | 1/2016 |
| JP | 2016-012917 | 1/2016 |
| WO | 2009/137621 A1 | 11/2009 |
| WO | 2013/065689 A1 | 5/2013 |
| WO | 2013/128317 A1 | 9/2013 |

OTHER PUBLICATIONS

Akira Yoshioka et al., "New Attestation Based Security Protocol for In-vehicle Communication", Symposium on Multimedia, Distributed, Cooperative and Mobile Systems (DICOM02008), Ronbunshu vol. 2008, No. 1, Jul. 2, 2008, pp. 1270-1275, and a corresponding partial English translation.

H. Kawczyk et al., RFC 2104 "HMAC: Keyed-Hashing for Message Authentication", [retrieved on May 26, 2014], Internet <URL: http://www.rfc-editor.org/rfc/rfc2104.txt>.

Keisuke Takemori et al., "Secure Boot Mechanisms for ARM Device Using SIM/UIM", the Institute of Electronics, Information and Communication Engineers, Symposium on Cryptography and Information Security (SCIS2014), 1B1-2, Jan. 2014, and a corresponding partial English translation.

Trusted Computing Group, [retrieved on Dec. 26, 2014], Internet <URL: http://www.trustedcomputinggroup.org/>.

"What Mechanism for Data Transmission in CAN Communication?", [retrieved on Dec. 26, 2014], Internet <URL: http://monoist.atmarkit.co.jp/mn/articles/0807/09/html>, and a corresponding full English translation.

Vector, "First Diagnosis—Introduction to Diagnostic Communication—", [retrieved on Dec. 26, 2014], Internet <URL: http://download.vector-japan.co.jp/pdf/HajimetenoD_ver101.pdf>, and a corresponding partial English translation.

AUTOSAR, "Specification of Module Secure Onboard CommunicATION AUTOSAR Release 4.2.1" [retreived on Feb. 18, 2015] Internet <URL: http://www.autosar.org/fileadmin/files/release/4-2/software-architecture/communication-stack/standard/AUTOSAR_SWS_SecureOnboardCommunication.pdf>.

Lin, C.-W. et al., Cyber-Security for the Controller Area Network (CAN) Communication Protocol, 2012, International Conference on Cyber Security, 2012, pp. 1-7.

Nilsson D. K. et al., "Efficient In-Vehicle Delayed Data Authentication Based on Compound Message Authentication Codes", IEEE 68th Vehicular Technology Conference, 2008, pp. 1-5.

International Search Report (ISR) in International Pat. Appl. No. PCT/JP2015/066344, dated Aug. 25, 2015.

International Search Report (ISR) in International Pat. Appl. No. PCT/JP2015/066378, dated Aug. 25, 2015.

Extended European Search Report for European Application No. 15802885.2, dated Jan. 12, 2018.

Keisuke Takemori et al., "Protection for Automotive Control System Using Secure Boot and Authentication," IEICE Technical Report, Sep. 12, 2014, vol. 114, No. 525, pp. 47-52.

Office Action issued in Japan Counterpart Patent Appl. No. 2015-088397, dated May 9, 2017, along with an English translation thereof.

Danies, D. W. and Price, W. L., "Security for computer networks", Nikkei-McGraw-Hill, Inc., Dec. 5, 1985, pp. 114-116, 126-128, for which a concise English description is provided in the Enlgish translation for the Office Action issued in Japan Patent Appl. No. 2015-088397.

Office Action issued in Japan Patent Appl. No. 2015-033103, dated May 9, 2017 , along with an English translation thereof.

Chinese Office Action dated Apr. 1, 2019 issued in Chinese Patent Application No. 201580029966.0, with a partial English translation.

* cited by examiner

FIG. 14

```
 0   2   4   6   8  10  12  14  16  18  20  22  24  26  28 29
 |   |   |   |   |   |   |   |   |   |   |   |   |   |   |  |
+-------------------+-------------------+-----------------+---------+
|   SOURCE ADDRESS  | DESTINATION ADDRESS| DESTINATION TYPE| FREE SPACE|
|     (8 BITS)      |     (8 BITS)      |    (8 BITS)     | (5 BITS)  |
+-------------------+-------------------+-----------------+---------+
```

| | | |
|---|---|---|
| 00000000 | 00000000 | 1000 |
| 00000001 | 00000001 | 0100 |
| 00000010 | 00000010 | 0010 |
| · · · | · · · | 0001 |
| 01100100 | 01100100 | |

CONVERSION/
COMPRESSION ⇩   ⇩   ⇩
TABLE

| | | |
|---|---|---|
| 0000000 | 000000 | 00 |
| 0000001 | 000001 | 01 |
| 0000010 | 000010 | 10 |
| · · · | · · · | 11 |
| 1100100 | 1100100 | |

```
 0   2   4   6   8  10  12  14  16  18  20  22  24  26  28 29
 |   |   |   |   |   |   |   |   |   |   |   |   |   |   |  |
+----------------+----------------+--+----------------------+
| SOURCE ADDRESS |DESTINATION ADDRESS|   MAC STORAGE AREA   |
|    (7 BITS)    |    (7 BITS)    |  |      (13 BITS)       |
+----------------+----------------+--+----------------------+
                                   \
                              DESTINATION
                                 TYPE
                               (2 BITS)
```

COMMUNICATION NETWORK SYSTEM, TRANSMISSION NODE, RECEPTION NODE, AND MESSAGE CHECKING METHOD

TECHNICAL FIELD

The present invention relates to a communication network system, a transmission node, a reception node, a message checking method, and a computer program.

The present application claims priority on Japanese Patent Application No. 2014-116917 filed on Jun. 5, 2014 and Japanese Patent Application No. 2015-88397 filed on Apr. 23, 2015, the entire content of which is incorporated herein by reference.

BACKGROUND ART

Conventionally, CAN (Controller Area Network) known as one communication network installed in vehicles has been used for communications between various types of ECU (Electronic Control Unit) in vehicles. As technologies permitting message authentication in CAN, for example, technologies disclosed in Non-Patent Literatures 1, 2 and Patent Literature 1 have been known.

According to the conventional technology disclosed in Non-Patent Literature 1, a real ECU detects a spoofed message adopting its own ID due to an attack, in which a false ECU connected to CAN transmits a spoofed message, so as to transmit abnormality notifying message adopting its own ID, thus notifying an abnormality to a reception-side ECU.

According to the conventional technology disclosed in Non-Patent Literature 2, the information stored in an error correcting (Cyclic Redundancy Check: CRC) field of a CAN frame is changed with MAC (Message Authentication Code). In the conventional technology, a transmission side generates 64-bit MAC based on data (64×4=256 bits) of data fields in four CAN frames N to N+3, divides MAC into four sections each having 16 bits, store four sections in CRC fields (16 bits) of four CAN frames N+4 to N+7, and then transmits those CAN frames. A reception side acquires MAC from CRC fields of CAN frames N+4 to N+7 so as to determine whether or not acquired MAC matches MAC generated based on data fields of CAN frames N to N+3, thus determining whether CAN frames N to N+3 are authentic or not. Thus, it is possible to determine that any one of CAN frames N to N+3 is inauthentic when MAC obtained from CRC fields differs from MAC calculated based on data fields.

The technology disclosed in Patent Literature 1 counts the number of times each ECU transmits messages for each CAN ID. Upon transmitting a main message, a transmission node transmits a MAC message including a data field and CAN ID of a main message and a count value associated to CAN ID. Upon receiving a main message, a reception node generates MAC based on a data field and CAN ID of a main message and a count value associated to CAN ID so as to determine whether or not MAC matches MAC included in the received MAC message.

CITATION LIST

Patent Literature

Patent Literature 1: International Publication No. WO 2013/065689

Non-Patent Literature

Non-Patent Literature 1: Masato Hata, Masato Tanabe, Katsunari Yoshioka, Kazuomi Oishi, Tsutomu Matsumoto, "How to Stop Unauthorized Transmission in Controller Area Network", Information Processing Society of Japan, Computer Security Symposium (CSS2011), pp. 624-629, October 2011

Non-Patent Literature 2: Akira Yoshioka et al.: "Kosei Shomei Kino o Motsu Shanai Tsushin Protocol no Teian" Symposium on Multimedia, Distributed, Cooperative and Mobile Systems (DICOM02008) Ronbunshu vol. 2008, no. 1, 02 Jul. 2008, pp. 1270-1275

Non-Patent Literature 3: RFC 2104 HMAC: Keyed-Hashing for Message Authentication, [retrieved on May 26, 2014], Internet <URL: http://www.rfc-editor.org/rfc/rfc2104.txt>

Non-Patent Literature 4: RFC 2104 HMAC: Keyed-Hashing for Message Authentication, [retrieved on May 26, 2014], Internet <URL: hap://www.ipa.go.jp/security/rfc/RFC 2104JA.html>

Non-Patent Literature 5: Keisuke Takemori, Hideaki Kawabata, Ayumi Kubota, "Secure Boot via AMR+SIM/UIM", the Institute of Electronics, Information and Communication Engineers, Symposium on Cryptography and Information Security (SCIS2014), 1B1-2, Jan. 2014

Non-Patent Literature 6: Trusted Computing Group, [retrieved on Dec. 26, 2014], Internet <URL:http://www.trustedcomputinggroup.org/>

Non-Patent Literature 7: "What Mechanism for Data Transmission in CAN Communication?", [retrieved on Dec. 26, 2014], Internet <URL: http://monoist.atmarkit.cojp/mn/articles/0807/09/news140.html>

Non-Patent Literature 8: "First Diagnosis Introduction to Diagnostic Communication-", [retrieved on Dec. 26, 2014], Internet <URL: http://download.vector-japan.co.jp/pdf/HajimetenoD_ver101.pdf>

SUMMARY OF INVENTION

Technical Problem

However, the conventional technology disclosed in Non-Patent Literature 1 is unable to notify abnormality due to removal of a real ECU monitoring communications. The conventional technology disclosed in Non-Patent Literature 2 takes time to confirm authentication since it needs to wait for reception of CAN frames N+4 to N+7 in order to confirm authentication with CAN frames N to N+3. For this reason, this technology is not suitable for any situation requiring real-time control. The conventional technology disclosed in Patent Literature 1 may increase the amount of communications two times or more since it needs to transmit MAC messages independently of main messages. Additionally, this technology takes time to authenticate main messages since it needs to wait for reception of MAC messages. Thus, this technology suffers from problems concerning suppression of communication bands in CAN and a reduction of immediacy.

The present invention is made in consideration of the aforementioned circumstances; hence, the present invention aims to provide a communication network system, a transmission node, a reception node, a message checking method, and a computer program, thus improving message checking performance in a communication network system in which a transmission node configured to transmit messages is connected to a reception node configured to receive messages.

Solution To Problem

According to one aspect of the present invention, a communication network system connects a transmission node configured to transmit a message and a reception node configured to receive the message. The transmission node includes a transmission counter holding a transmission count value being increased by a predetermined count value upon transmitting each message, a secret information storage unit configured to store secret information, a message authentication code generator configured to generate a message authentication code based on transmission data stored in a data section of the message, the transmission count value, and the secret information, and a transmitter configured to transmit the message including the transmission data and the message authentication code. The reception node includes a reception counter configured to increase a reception count value being increased by the predetermined count value upon receiving each message, a secret information storage unit configured to store the secret information, and a message authentication code checking part configured to generate a message authentication code based on reception data, obtained from a data section of a received message, the reception count value, and the secret information, thus checking whether the message authentication code matches the message authentication code obtained from the received message.

In the communication network system according to one aspect of the preset invention, wherein it is preferable that the message authentication code generator solely use extracted upper bits, corresponding to a predetermined number of bits extracted from a bit string of the transmission count value, in order to generate the message authentication code. It is preferable that the transmitter solely store one portion of a bit string of the message authentication code, specified by a value of lower bits other than the extracted upper bits within the bit string of the transmission count value, in a transmitting message. It is preferable that the message authentication code checking part solely use the extracted upper bits, corresponding to the predetermined number of bits extracted from the bit string of the reception count value, in order to generate the message authentication code so as to solely use one portion of the bit string of the message authentication code, specified by a value of lower bits other than the extracted upper bits within the bit string of the reception count value, subjected to checking whether to match the message authentication code obtained from the received message.

In the communication network system according to one aspect of the present invention, it is preferable that the message authentication code checking part solely uses one portion of the bit string, specified by a value of lower bits in the reception count value being increased by the predetermined count value, subjected to rechecking when a checking result indicates unmatched.

In the communication network system according to one aspect of the present invention, it is preferable that the reception counter sets the value of lower bits, whose rechecking result indicates match, to a value of lower bits in the reception count value being held thereby.

In the communication network system according to one aspect of the present invention, it is preferable that the message authentication code generator solely use the extracted upper bits, corresponding to the predetermined number of bits extracted from the bit string of the transmission count value, in order to generate the message authentication code. It is preferable that the transmitter stores one portion of the bit string of the message authentication code, specified by the value of lower bits other than the extracted upper bits within the bit string of the transmission count value, and positional information representing one portion of the bit string located in the bit string of the message authentication code in a transmitting message. It is preferable that the message authentication code checking part solely use the extracted upper bits, corresponding to the number of bits extracted from the bit string of the reception count value, in order to generate the message authentication code so as to solely use one portion of the bit string of the message authentication code, based on the positional information obtained from a received message, subjected to checking whether to match the message authentication code obtained from the received message.

According to one aspect of the present invention, a transmission node is adapted to a communication network system connecting a transmission code configured to transmit a message and a reception node configured to receive the message. The transmission node includes a secret information storage unit configured to store secret information identical to secret information held by the reception node, a transmission counter configured to hold a transmission count value being increased by a predetermined count value for transmitting each message, a message authentication code generator configured to generate a message authentication code based on transmission data stored in a data section of the message, the transmission count value, and the secret information, and a transmitter configured to transmit the message including the transmission data and the message authentication code.

According to one aspect of the present invention, a reception node is adapted to a communication network system connecting a transmission node configured to transmit a message and the reception node configured to receive the message. The reception node includes a secret information storage unit configured to store secret information identical to secret information held by the transmission node, a reception counter configured to hold a reception count value being increased by a predetermined count value, corresponding to a predetermined count value used in the transmission node, for receiving each message, and a message authentication code checking part configured to generate a message authentication code based on reception data, obtained from a data section of a received message, the reception count value, and the secret information so as to check whether the message authentication code matches an message authentication code obtained from the received message.

According to one aspect of the present invention, a message checking method is adapted to a communication network system connecting a transmission node configured to transmit a message and a reception node configured to receive the message. The message checking method includes the steps of: storing, by the transmission node and the reception node, same secret information as the reception node; holding, by the transmission node, a transmission count value being increased by a predetermined count value for transmitting each message; generating, by the transmission node, a message authentication code based on transmission data, stored in a data section of the message, the transmission count value, and the secret information; transmitting, by the transmission node, the message including the transmission node and the message authentication code; holding, by the reception node, a reception count value being increased by the predetermined count value for receiving each message; generating, by the reception node, a message authentication code based on reception data, obtained from a data section of a received message, the reception count value, and the secret information; and checking whether the message authentication code matches the message authentication code obtained from the received message.

According to one aspect of the present invention, a non-transient computer-readable storage medium storing a computer program is provided to cause a computer of a transmission node, adapted to a communication network system connecting a transmission node configured to transmit a message and a reception node configured to receive the message, to implement the steps of: storing secret information identical to secret information held by the reception node; holding a transmission count value being increased by a predetermined count value for transmitting each message; generating a message authentication code based on transmission data stored in a data section of the message, the transmission count value, and the secret information; and transmitting the message including the transmission data and the message authentication code.

According to one aspect of the present invention, a non-transient computer-readable storage medium storing a computer program is provided to cause a computer of a reception node, adapted to a communication network system connecting a transmission node configured to transmit a message and a reception node configured to receive the message, to implement the steps of: storing secret information identical to secret information held by the transmission node; holding a reception count value being increased by a predetermined count value, corresponding to a predetermined count value used in the transmission node, for receiving each message; generating a message authentication code based on reception data, obtained from a data section of a received message, the reception count value, and the secret information; and checking whether the message authentication code matches a message authentication code obtained from the received message.

Advantageous Effects of Invention

According to the present invention, it is possible to achieve an effect of improving message checking performance in a communication network system in which a transmission node configured to transmit messages is connected to a reception node configured to receive messages.

BRIEF DESCRIPTION OF DRAWINGS

FIG. 14 is an explanatory diagram showing Example 2 of a MAC storing method according to one embodiment of the present invention.

DESCRIPTION OF EMBODIMENTS

Hereinafter, the present invention will be described using embodiments with reference to the drawings.

First Embodiment

Figure 1:
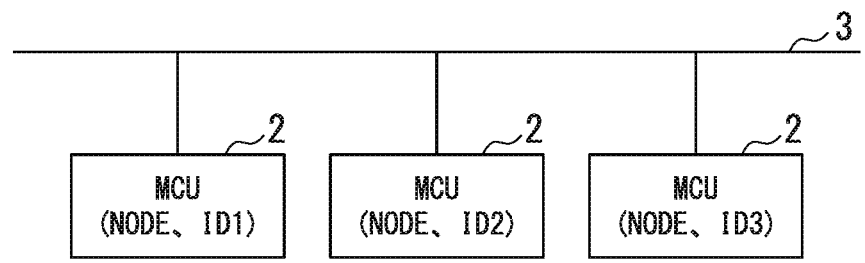
FIG. 1 is a block diagram showing a communication network system according to the first embodiment of the present invention.

The present embodiment will be described by taking an example of CAN serving as a communication network system installed in a vehicle with respect to one example of a communication network system according to the present invention. FIG. 1 is a block diagram showing the configuration of a communication network system according to the first embodiment of the present invention.

In FIG. 1, a communication network system 1 includes a plurality of MCU_2 (Micro Computing Unit). Herein, MCU_2 is one type of computer configured of a CPU (Central Processing Unit), memory, etc. The MCU_2 executes a computer program with its own CPU so as to achieve the function of the computer program. Each MCU_2 is used for an electronic control unit (ECU) configured to control devices installed in each vehicle.

Multiple units of MCU_2 are connected to a communication bus 3 of CAN. For the sake of explanation, the communication network system 1 of the present embodiment includes three units of MCU_2, which are connected to the communication bus 3. The communication bus 3 transmits messages exchanged between multiple units of MCU_2. Multiple units of MCU_2 mutually transmit and receive messages through the communication bus 3. The CAN is designed to transmit messages in a predetermined frame. Each MCU_2 serves as a node (or a communication device) in CAN. In the present embodiment, each MCU_2 has the function of a transmission node configured to transmit messages and the function of a reception node configured to receive messages. As shown in FIG. 1, three units of MCU_2 are assigned their identifiers (ID) in CAN, i.e. ID1, ID2, ID3.

Figure 2:
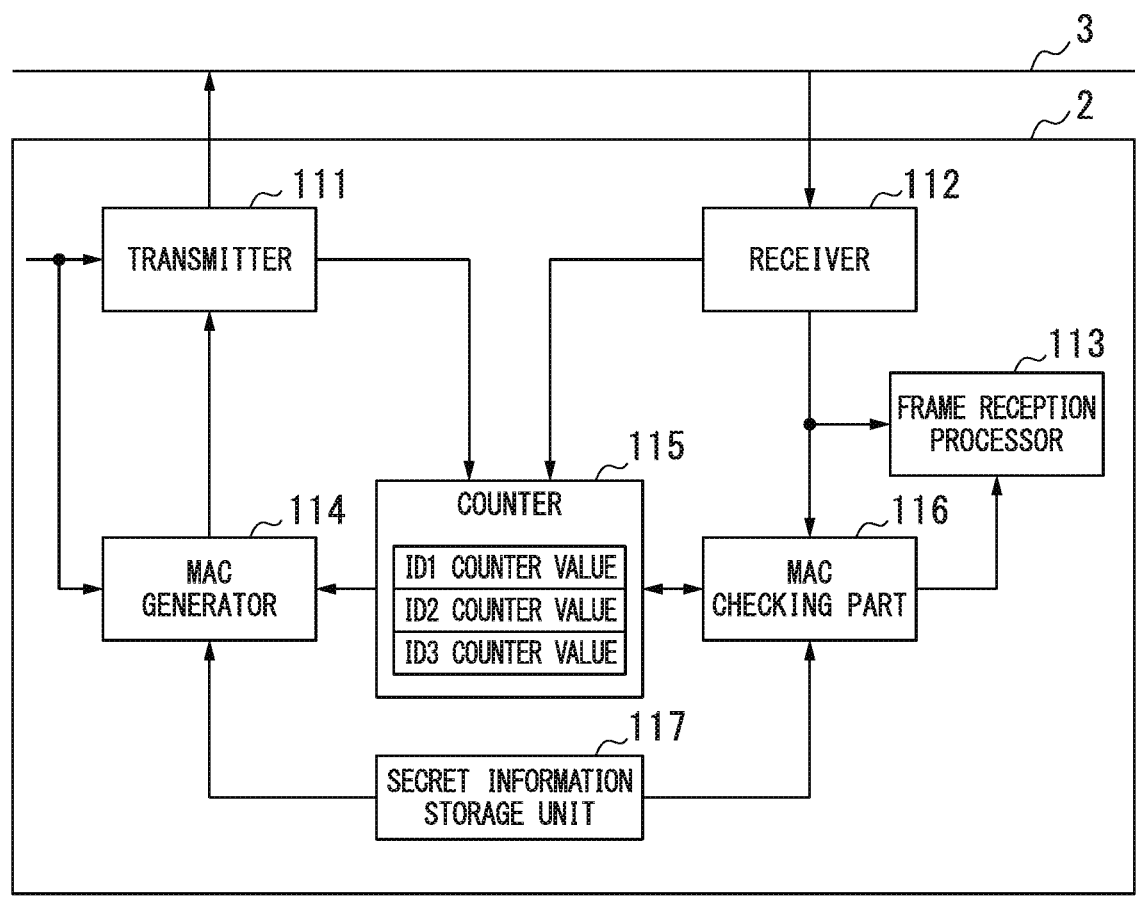
FIG. 2 is a block diagram showing MCU_2 (node) according to the first embodiment of the present invention.

FIG. 2 is a block diagram showing the configuration of MCU_2 (node) according to the first embodiment of the present invention.

In FIG. 2, the MCU_2 includes a transmitter 111, a receiver 112, a frame reception processor 113, a MAC (Message Authentication Code) generator 114, a counter 115, a MAC (Message Authentication Code) checking part 116, and a secret information storage unit 117.

The transmitter 111 transmits a message having a predetermined format to the communication bus 3. The receiver 112 receives a message having a predetermined format through the communication bus 3.

Figure 3:
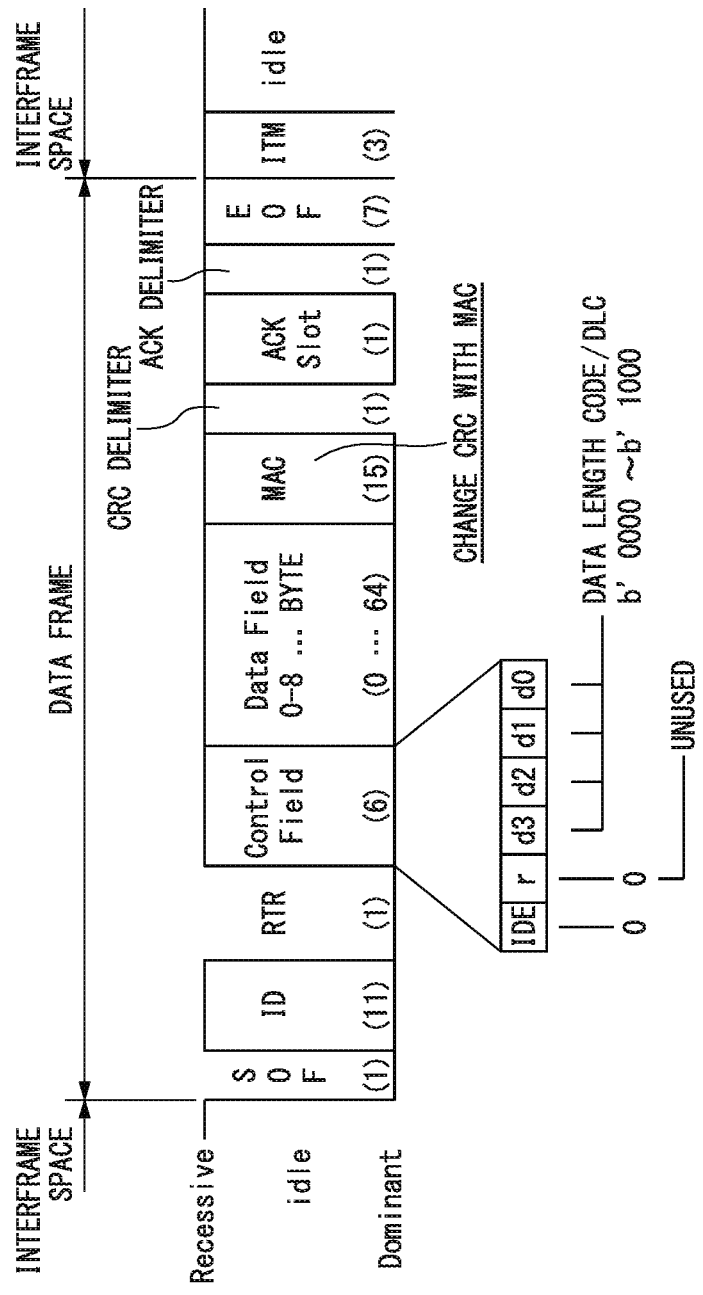
FIG. 3 is a diagram showing a data frame according to the first embodiment of the present invention.

FIG. 3 is a diagram showing the configuration of a data frame according to the first embodiment. In the data frame of FIG. 3, the number in parentheses described in each field indicates the number of bits constituting the information stored in each field.

The data frame configuration shown in FIG. 3 is partially modified in comparison with a data frame configuration having a standard format in CAN. The present embodiment replaces information stored in a CRC field (or a CRC section) of a data frame with a message authentication code (MAC). In the data frame, remaining sections other than the CRC section are not changed from the standard format of CAN. Hereinafter, the data frame of the present embodiment shown in FIG. 3 will be referred to as a CAN frame.

Returning back to FIG. 2, the transmitter 111 inputs data such as transmission data stored in a CAN frame. The transmitter 111 transmits a CAN frame storing input data in its counterpart section to the communication bus 3. The transmission data is stored in a data field (or a data section) shown in FIG. 3. The frame reception processor 113 carries out a reception process for a CAN frame received by the receiver 112 via the communication bus 3. The MAC generator 114 generates MAC based on transmission data or the like stored in the data section of a CAN frame.

The counter 115 has the function of a transmission counter and the function of a reception counter. As the function of a transmission counter, the counter 115 holds a transmission count value which is increased by a predetermined count value every time the transmitter 111 transmits a CAN frame. The present embodiment sets the count value to 1. Therefore, the counter 115 holds a transmission count value which is increased by 1 every time the transmitter 111 transmits a CAN frame. The transmission count value is increased by 1 every time each MCU_2 (node) transmits a CAN frame.

As the function of a reception counter, the counter 115 holds a reception count value which is increased by the same value as the predetermined count value, used for the transmission counter, every time the receiver 112 receives a CAN frame. The present embodiment sets the count value to 1. Therefore, the counter 115 holds a reception count value which is increased by 1 every time the receiver 112 receives a CAN frame. The reception count value is assigned to an ID of each CAN frame. This ID is an ID assigned to MCU_2 (node) transmitting a CAN frame, which is stored in an ID field (or an ID section) in FIG. 3.

In the present embodiment including three units of MCU_2 (whose identifiers are ID1, ID2, ID3), as shown in FIG. 2, the counter 115 holds three count values (i.e. a count value of ID1, a count value of ID2, a count value of ID3) with respect to three units of MCU_2 (whose identifiers are ID1, ID2, ID3). In the counter 115, a count value associated to ID of its own MCU_2 is a transmission count value, while count values associated to IDs of other units of MCU_2 are reception count values. In the MCU_2 of ID1, for example, a count value of ID1 is a transmission count value; a count value of ID2 is a reception count value associated to ID2; a count value of ID3 is a reception count value associated to ID3.

The MAC checking part 116 checks MAC retrieved from a CAN frame received by the receiver 112 through the communication bus 3. The secret information storage unit 117 stores same secret information in each MCU_2. The secret information is safely set to each MCU_2 in manufacturing each MCU_2.

Next, the operation of according to the present embodiment will be described below.

[Operation of Transmission Node]

Figure 4:
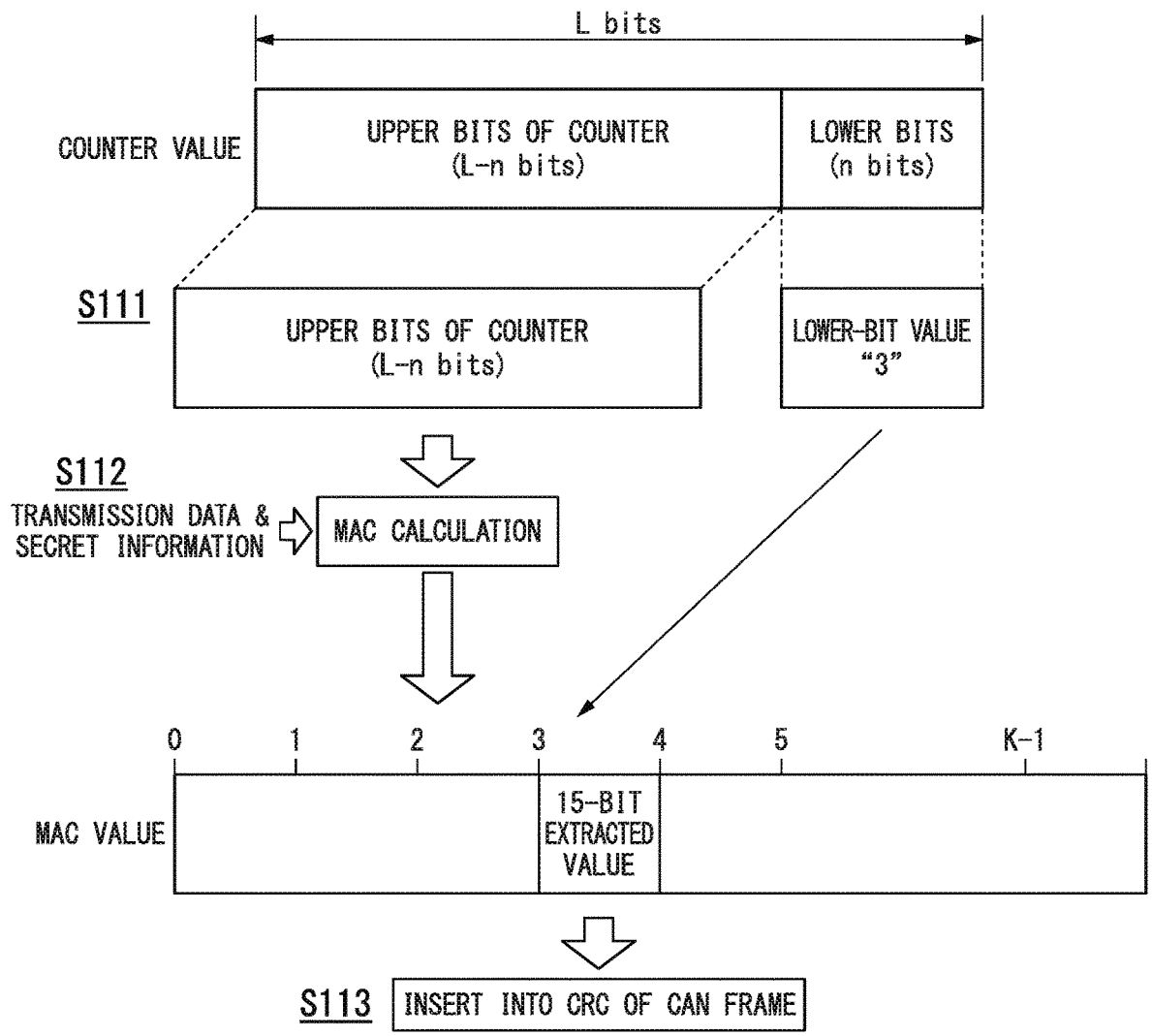
FIG. 4 is a diagram showing a procedure of a transmission process according to the first embodiment of the present invention.

The operation of MCU_2 serving as a transmission node will be described with reference to FIG. 4. FIG. 4 is a diagram showing the procedure of a transmission process according to the first embodiment of the present invention. The transmission process of FIG. 4 is started upon generating a CAN frame to be transmitted by the transmitter 111.

(Step S111)

The MAC generator 114 obtains a transmission count value from the counter 115. The MAC generator 114 acquires extracted upper bits (with a bit count "L-n") by solely extracting upper bits, i.e. a predetermined number of extracted bits (i.e. L-n bits), from the bit string (with a bit count L) of the transmission count value.

(Step S112)

The MAC generator 114 generates MAC by use of transmission data stored in a data section of a CAN frame, extracted upper bits acquired in step S111, and secret information stored in the secret information storage unit 117. As MAC, for example, it calculates a hash value. As a method of calculating a hash value, for example, it is possible to name SHA-256. In this connection, for example, Non-Patent Literatures 3, 4 disclose calculation methods of hash values.

(Step S113)

The MAC generator 114 extracts a bit string (15 bits) to be stored in a CRC section of a CAN frame from the bit string of MAC (i.e. a MAC value) which is generated in step S112. The extracted bit string is specified by a value of predetermined lower bits (with a bit count n), other than the extracted upper bits, within the bit string (with a bit count L) of the transmission count value which is obtained in step S111. FIG. 4 exemplifies a value of lower bits (with a bit count n) at "3". Thus, one portion (15 bits) specified by the value "3" is extracted from the bit string of a MAC value.

The present embodiment provides a CAN frame with a CRC section having 15 bits, and therefore the present embodiments extracts 15 bits specified by the value "3"

from the bit string of a MAC value as the information stored in a CRC section. For this reason, the present embodiment partitions the bit string of a MAC value into 15-bit sections, and therefore the present embodiment specifies which 15-bit section should be stored in a CRC section of a CAN frame based on the value of lower bits (with a bit count n). In FIG. 4, K sections (i.e. 15 bits for each section) is determined depending on the total number of bits in a MAC value.

The transmitter 111 stores transmission data (which is used for MAC generation in step S112) in a data section while storing a bit string having 15 bits, which is extracted from the bit string of a MAC value in step S113, in a CRC section with respect to a CAN frame. The transmitter 111 transmits the CAN frame to the communication bus 3. The counter 115 holds a transmission count value which is increased by 1 due to transmission of the CAN frame.

The above description refers to the operation of a transmission node.

[Operation of Reception Node]

Figure 5:
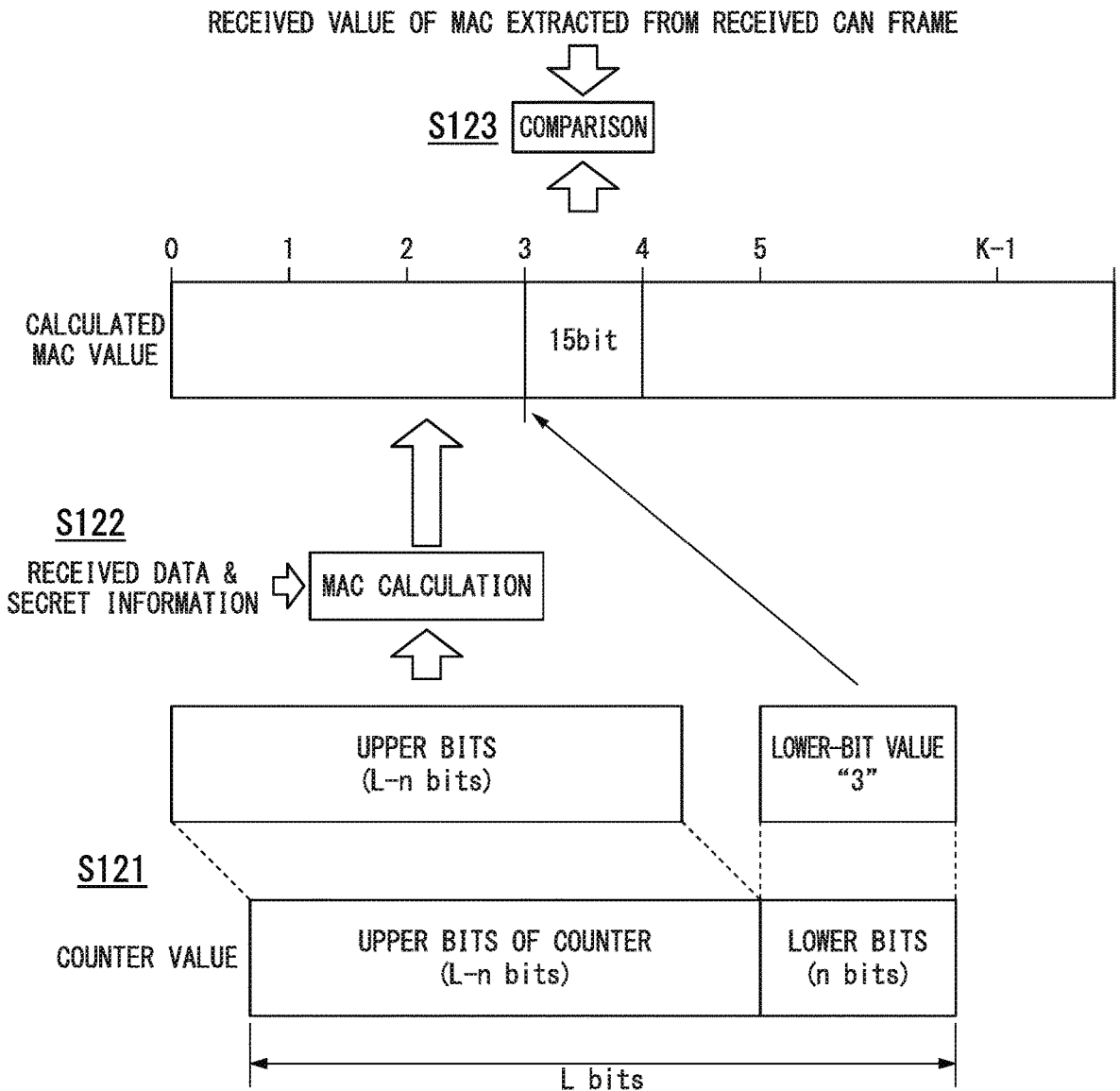
FIG. 5 is a diagram showing a procedure of a reception process according to the first embodiment of the present invention.
Figure 6:
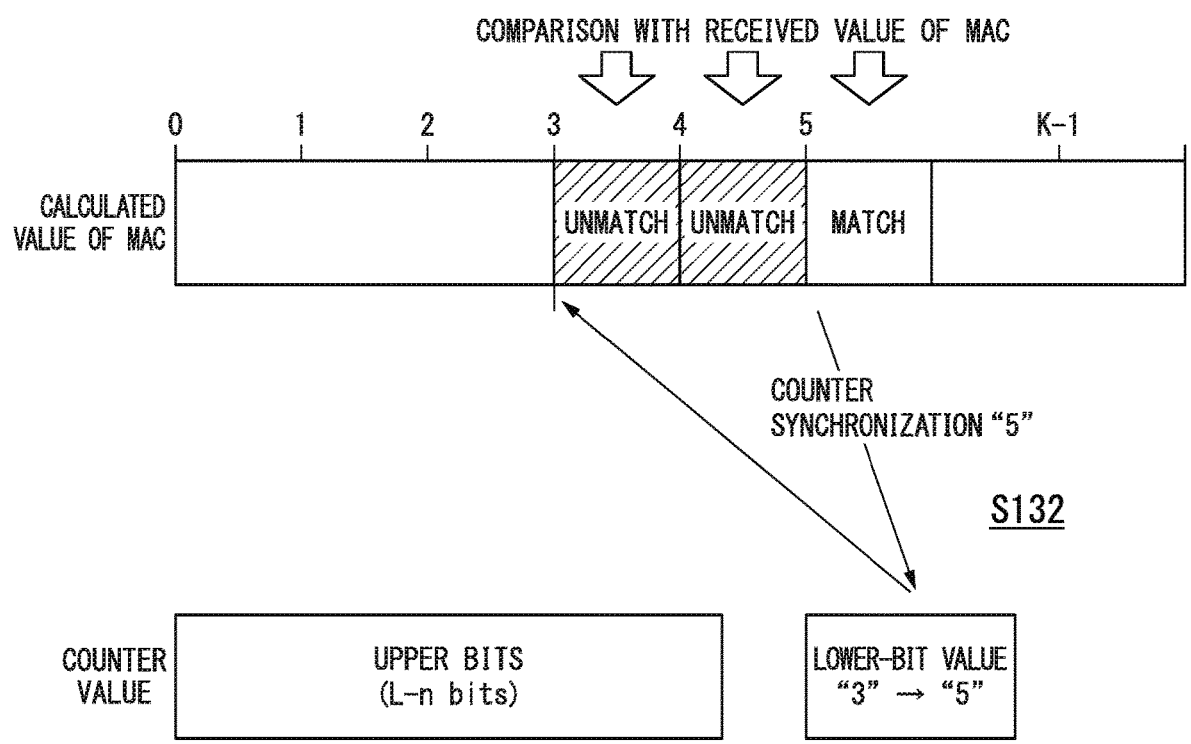
FIG. 6 is a diagram showing a procedure of a reception process according to the first embodiment of the present invention.

Next, the operation of MCU_2 serving as a reception node will be described with reference to FIGS. 5 and 6. FIGS. 5 and 6 are diagrams showing procedures concerning a reception process according to the first embodiment of the present invention. The reception process of FIG. 5 is started when the receiver 112 receives a CAN frame.

(Step S121)

The MAC checking part 116 retrieves from the counter 115 a reception count value associated to ID stored in an ID section of a CAN frame received by the receiver 112. The MAC checking part 116 obtains extracted upper bits (with a bit count "L-n"), i.e. upper bits with a predetermined extracted bit count (L-n bits), from a bit string (with a bit count L) of the retrieved reception count value. The method of obtaining extracted upper bits is identical to that in the foregoing process (step S111) of the MAC generator 114.

(Step S122)

The MAC checking part 116 generates MAC based on the reception data retrieved from a data section of a CAN frame received by the receiver 112, extracted upper bits obtained in step S121, and secret information stored in the secret information storage unit 117.

The value of MAC (i.e. a calculated MAC value) is calculated using the same calculation method (e.g. calculation of hash values using SHA-256) as the foregoing one of the MAC generator 114.

(Step S123)

The MAC checking part 116 extracts a checking bit string (15 bits) subjected to checking from a MAC bit string (or a calculated MAC value) generated in step S122. The extraction method of extracting a checking bit string is identical to the foregoing extraction method (step S113) of extracting a bit string (15 bits) stored in a CRC section of a CAN frame by the MAC generator 114. That is, the checking bit string is one portion (15 bits) of a bit string of a calculated MAC value which is specified by a value of predetermined lower bits (with a bit count n) other than extracted upper bits within a bit string (with a bit count L) of a reception count value obtained in step S121. FIG. 5 shows an example in which the value of lower bits (with a bit count n) is "3". Thus, it is possible to extract one portion (15 bits), specified by the value "3", from a bit string of a calculated MAC value.

The present embodiment checks whether the information stored in a CRC section (15 bits) of a CAN frame matches a checking bit string (15 bits) extracted from a bit string of a calculated MAC value. Similar to the foregoing transmission process, the present embodiment determines 15-bit sections with respect to a hit string of a calculated MAC value, and therefore the present embodiment specifies which 15-bit section should be regarded as a checking bit string by use of the value of lower bits (with a bit count n) of a reception count value. FIG. 5 shows an example which determines K sections (each section having 15 bits) depending on the total number of bits of a calculated MAC value.

The MAC checking part 116 determines whether or not a MAC value (i.e. a received MAC value (15 bits)) obtained from a CRC section of a CAN frame received by the receiver 112 matches a checking bit string (15 bits) extracted from a bit string of a calculated MAC value.

When the determination result indicates that the received MAC value matches the checking bit string, the MAC checking part 116 notifies checking pass to the frame reception processor 113. Thus, the frame reception processor 113 carries out a predetermined reception process for a CAN frame normally received by the receiver 112. Additionally, the MAC checking part 116 notifies checking pass to the counter 115. Accordingly, the counter 115 holds a reception count value which is increased by 1. The reception count value subjected to counting is a reception count value associated to ID stored in an ID section of a CAN frame received by the receiver 112.

When the determination result indicates that the received MAC value does not match the checking bit string, the MAC checking part 116 carries out a rechecking process shown in FIG. 6. Hereinafter, the rechecking process will be described with reference to FIG. 6.

(Step S131)

The MAC checking part 116 extracts a rechecking bit string (15 bits) subjected to rechecking from a bit string of a calculated MAC value generated in step S122. The extraction process of extracting a rechecking bit string is identical to the foregoing extraction process of extracting a checking bit string, whereas it uses an increased value (i.e. an increased reception count value) which is increased from a reception count value obtained in step S121. Specifically, the MAC checking part 116 adds 1 to a reception count value. Next, it extracts a rechecking bit string, i.e. one portion (15 bits) of a bit string of a calculated MAC value which is specified by the value of lower bits (with a bit count n) within a bit string of an increased reception count value which is increased by adding 1 to a reception count value.

The MAC checking part 116 determines whether the extracted rechecking bit string matches the received MAC value. When the determination result indicates unmatched, it generates a new increased reception count value by further adding 1 to the increased reception value at present. Subsequently, it extracts a new rechecking bit string, i.e. one portion (15 bits) of a bit string of a calculated MAC value which is specified by the value of lower bits (with a bit count n) within a bit string of the new increased reception count value. Next, it determines whether the new rechecking bit string being extracted matches the received MAC value. The rechecking is repeated until the determination result indicates matched. In this connection, the rechecking will be terminated with a terminal section of a bit string of a calculated MAC value (i.e. a section specified by a value "K−1" represented by lower bits). This is because the value of extracted upper bits, which is used for generating a calculated MAC value, may be changed due to carrying the value of lower bits.

Therefore, when the MAC checking part 116 fails to determine matched with a received MAC value irrespective of checking being carried out up to a section specified by a value "K−1" of lower bits within a bit string of a calculated MAC value, it recalculates a MAC value using extracted upper bits after carrying the value of lower bits, and thereafter it determines matched with a received MAC value by use of a new MAC value being recalculated in a similar manner as the foregoing rechecking process.

(Step S132)

When the result of rechecking in step S131 indicates that a rechecking bit string matches a received MAC value, the MAC checking part 116 notifies the value of lower bits in a rechecking bit string to the counter 115 so as to issue a counter synchronization instruction. Due to the counter synchronization instruction, the counter 115 changes the value of lower bits (with a bit count n) of a reception count value with the notified value of lower bits. The reception count value subjected to counter synchronization is a reception count value associated to ID stored in an ID section of a CAN frame received by the receiver 112. Thus, it is possible to synchronize a transmission count value of a transmission node having its ID with a reception count value of a reception node having its ID.

FIG. 6 shows an example indicating the value "3" with respect to the value of lower bits (with a bit count n) in a reception count value obtained in step S121. The checking bit string specified by the value "3" does not match the received MAC value. For this reason, the MAC checking part 116 generates a rechecking bit string, which is specified by the value "4" represented by lower bits (with a bit count n) within a bit string of an increased reception count value which is produced by adding 1 to a reception count value obtained in step S121, so as to determine whether the rechecking bit string matches the received MAC value. FIG. 6 shows an example indicating that the rechecking bit string specified by the value "4" does not match the received MAC value. For this reason, the MAC checking part 116 generates another rechecking bit string, which is specified by the value "5" represented by lower bits (with a bit count n) within a bit string of a new increased reception count value which is produced by adding 1 to the increased reception count value at present, so as to determine whether another rechecking bit string matches the received MAC value. FIG. 6 shows an example indicating that the rechecking bit string specified by the value "5" matches the received MAC value. Thus, the counter 115 changes the value of lower bits (with a bit count n) in a reception count value from "3" to "5".

When the determination result indicates that any rechecking bit string does not match a received MAC value irrespective of repeating rechecking by a predetermined number of times, the MAC checking part 116 notifies a checking failure to the frame reception processor 113. Thus, the frame reception processor 113 discards a CAN frame received by the receiver 112. This is because it is assumed that a communication error or an attack of transmitting a spoofed message may occur. In the case of a checking failure, the MAC checking part 116 does not notify checking pass to the counter 115. Thus, the counter 115 does not increase a reception count value associated to ID stored in an ID section of a CAN frame received by the receiver 112.

The reception node determines that a replay attack may occur when it consecutively receives CAN frames having the same ID and the same MAC value two times or more.

In this case, it is possible to provide a countermeasure of inhibiting a reception process with respect to any CAN frame having the same ID.

The above is a description concerning the operation of a reception node.

The present embodiment stores MAC, which is generated using transmission data stored in a data section of a CAN frame transmitted by a transmission node, in a CRC section of the CAN frame. Subsequently, a reception node checks a received CAN frame by use of MAC generated using reception data obtained from a data section of the CAN frame and MAC obtained from a CRC section of the CAN frame. Thus, it is possible to solve a problem concerning suppression of communication bands for CAN due to CAN frames with MAC since it is unnecessary for a transmission node to transmit another CAN frame with MAC different than a CAN frame using transmission data. Additionally, it is possible to realize immediacy in checking since it is possible to receive both transmission data and MAC with the same CAN frame.

Moreover, checking may fail in CAN frames with MAC generated by a transmission node not having secret information since MAC is generated using secret information commonly applied to a transmission node and a reception node. Thus, it is possible to improve the reliability in checking CAN frames.

Different MAC values are stored in CAN frames being transmitted since each CAN frame stores a section specified by lower bits of a transmission count value within a generated bit string of MAC. Thus, it is possible to easily detect a replay attack of repeatedly transmitting the same CAN frame. Additionally, it is possible to detect alteration of transmission data at a reception node since a transmission node generates MAC using transmission data stored in a data section of each CAN frame.

The present embodiment uses extracted upper bits of a count value for generating MAC while determining which part of MAC should be stored in a CRC section based on lower bits other than extracted upper bits of a count value. Thus, it is possible to repeatedly carrying out rechecking while changing a rechecking bit string with the same MAC since it is unnecessary to recalculate MAC before lower bits are carried in rechecking MAC. That is, it is possible to reduce the amount of calculations during checking and to contribute to a reduction of checking time.

The present embodiment is able to achieve an effect of requiring less change in the existing frame format of CAN.

In this connection, the present embodiment may pose a possibility of causing MAC collision since it solely stores one portion of MAC in a CRC section of a CAN frame. For example, hash-value collision may occur at a probability of "½" to the fifteenth power ($=1/32768$). After occurrence of collision with a certain hash value, the probability of causing another collision using a next hash value is further reduced to $1/32768$; this indicates a very small probability of consecutively causing occurrence of hash-value collisions. It is assumed that no collision concerning MAC (or hash values) occur in any one of CAN frames, for example, by consecutively transmitting multiple CAN frames (i.e. CAN frames differ from each other in MAC) having the same transmission data, which indicates a possibility of normal reception, and therefore it is possible to reduce influence to communication quality due to hash-value collision.

Figure 11:
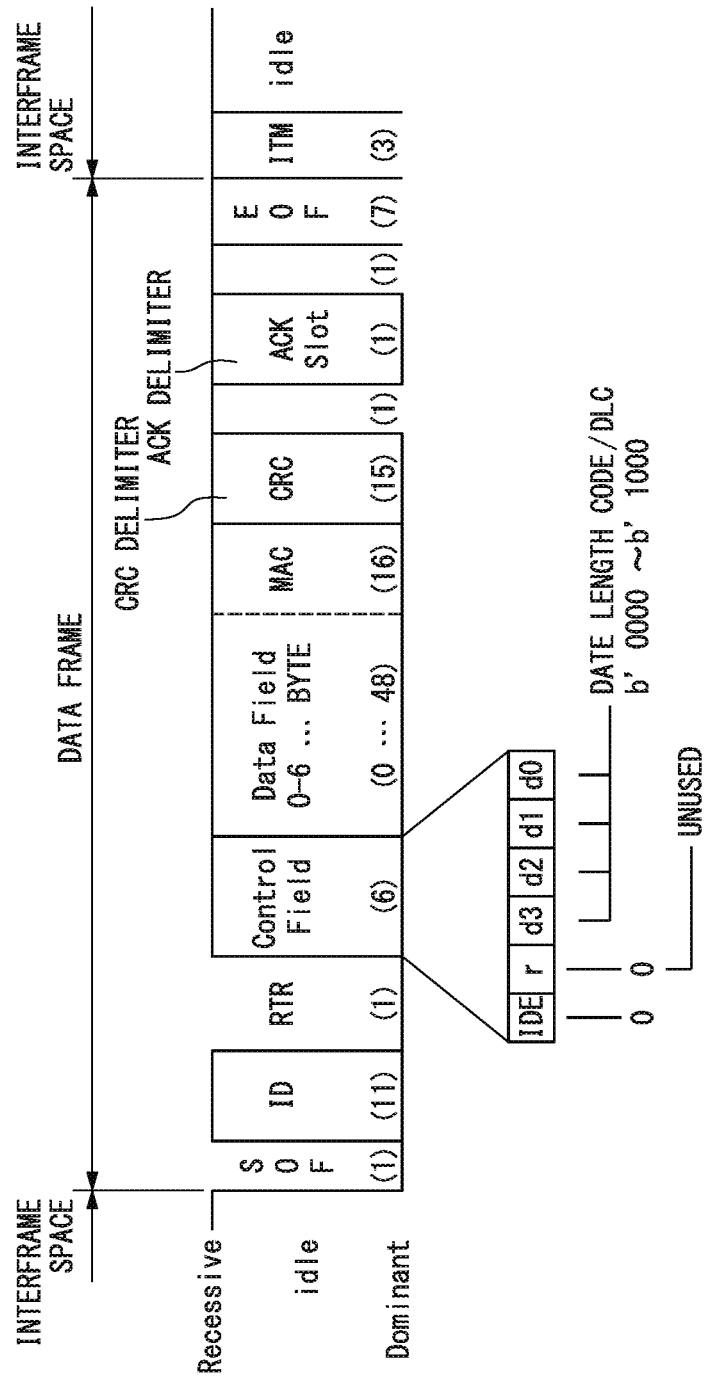
FIG. 11 is a configuration diagram showing another example of a data frame according to the first embodiment of the present invention.

The present embodiment is designed to store MAC in a CRC section of each CAN frame, but it is possible to store MAC in a data section of each CAN frame. FIG. 11 shows another example of a data frame according to one embodiment of the present invention. In the data frame of FIG. 11, numbers in parentheses described in fields indicates bit counts of information stored in fields. FIG. 11 shows the data frame configuration which is partially limited in comparison with the data frame configuration having the standard format of Can.

As shown in FIG. 11, MAC is stored in a data section (Data Field) of a data frame. Herein, MAC is stored at a predetermined location f a data section. For example, it is possible to store MAC at a first portion or a last portion of a data section. It is assumed that storing MAC at the last portion of a data section may hardly affect the existing usage of a data section. In an example of FIG. 11, MAC is stored in the last portion of a data section. In an example of FIG. 11, MAC has a data length of 16 hits. For this reason, as shown in FIG. 11, the maximum number of a data length accommodating other data than MAC stored in a data section is 48 bits. The data frame shown in FIG. 11 has the same format as the standard format of CAN except for storing MAC in a data section.

Compared with a CRC section (15 bits), a data section having a size of 64 bits is able to store a relatively large portion of MAC to be stored in the data frame. However, transmission data must be reduced in size by increasing a portion of MAC to be stored in the data frame; hence, it is preferable to reduce the size of MAC stored in a data section within a predetermined tolerance concerning influence due to MAC collision. In this connection, it is possible to utilize a CRC function by storing CRC in a CRC section when MAC is stored in a data section.

Second Embodiment

Figure 7:
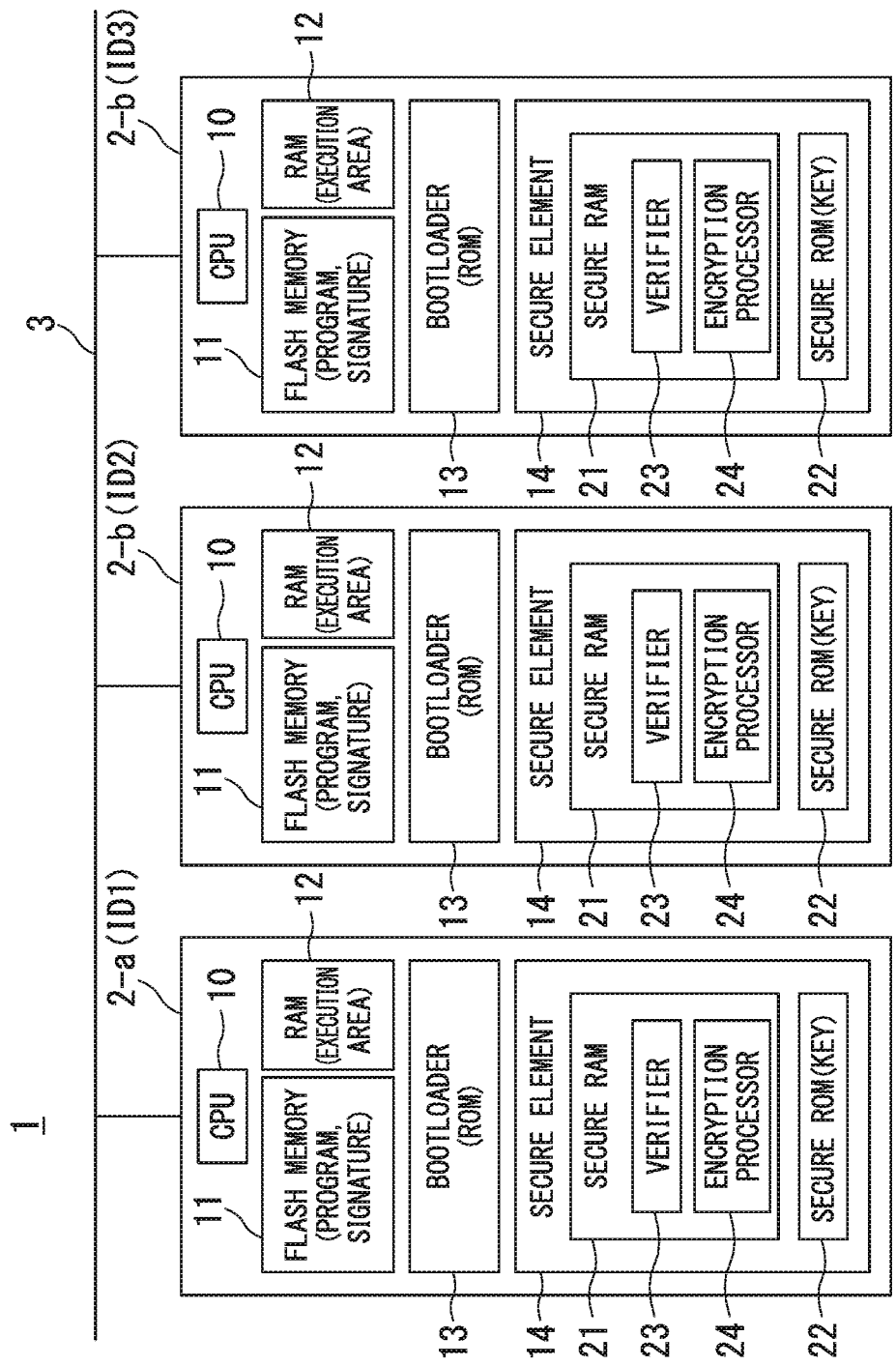
FIG. 7 is a block diagram showing a communication network system according to the second embodiment of the present invention.

The second embodiment is an example of configuring MCU_2 to safely store secret information in the first embodiment. FIG. 7 is a block diagram showing the configuration of the communication network system 1 according to the second embodiment of the present invention. The communication network system 1 shown in FIG. 7 is installed in a vehicle. In the communication network system 1 shown in FIG. 7, multiple units of MCU_2-*a* and MCU_2-*b* are connected to the communication bus 3 of CAN. For the sake of description, similar to the first embodiment, the second embodiment is described such that three units of MCU-2-*a* and MCU_2-*b* are connected to the communication bus 3. As shown in FIG. 7, three units of MCU_2-*a* and MCU_2-*b* are assigned identifiers (ID) of CAN, i.e. a single unit of MCU_2-*a* is applied ID1 while two units MCU_2-*b* are assigned ID2 and ID3.

In the above, MCU_2-*a* serves as a master to authenticate MCU_2-*b* connected to the communication bus 3 in an authentication process. Hereinafter, MCU_2-*a* will be referred to as "master MCU_2-*a*". Additionally, MCU_2-*b* will be referred to as "end MCU_2-*b*". In this connection, MCU_2-*a* and MCU_2-*b* will be collectively referred to as "MCU_2" when they are not necessarily differentiated from each other.

Next, the configuration for the master MCU_2-*a* and the end MCU_2-*b* will be described with reference to FIG. 7. Hereinafter, the configuration for the master MCU_2-*a* and the end MCU_2-*b*, each representing MCU_2, will be described below.

Each unit of MCU_2 includes a CPU_10, a flash memory 11, a RAM (Random-Access Memory)_12, a bootloader 13, and a secure element 14. The secure element 14 includes a secure RAM_21, a secure ROM (Read-Only Memory)_22, a verifier 23, and an encryption processor 24.

The CPU_10 executes computer programs so as to achieve an ECU function for controlling devices in a vehicle and a function of a CAN node. The flash memory 11 stores computer programs and signature concerning computer programs. The RAM_12 stores data. The RAM_12 serves as an execution area for the CPU_10 executing computer programs.

The bootloader 13 carries out a boot process in a power-on event of MCU_2. The bootloader 13 is manufactured in the form of ROM preventing any change applied to the content of the boot process.

The secure element 14 is configured as a safety element preventing any access to data held in the secure element 14 by any external device outside the secure element 14. The secure RAM_21 is a temporary storage area holding data in the secure element 14. The secure RAM_21 is configured to prevent any accessing thereto by any external device outside the secure element 14. The secure ROM_22 stores keys used inside the secure element 14. The secure ROM_2 is configured to prevent any accessing thereto by any external device outside the secure element 14. Herein, keys are safely written into the secure ROM_22 in advance, e.g. at its manufacturing.

The verifier 23 carries out a program validation process, involved in a boot process of the bootloader 13, by use of a signature verification key held in the secure ROM_22. The verifier 23 uses the secure RAM_21 for a temporary storage area in the program validation process.

The encryption processor 24 carries out an encryption process for information, exchanged between its own MCU_2 and other MCU_2 by use of an encryption key held in the secure ROM_22. The encryption process refers to an encryption process or a decryption process. The encryption processor 24 uses the secure RAM_21 for a temporary storage area in the encryption process.

Figure 8:
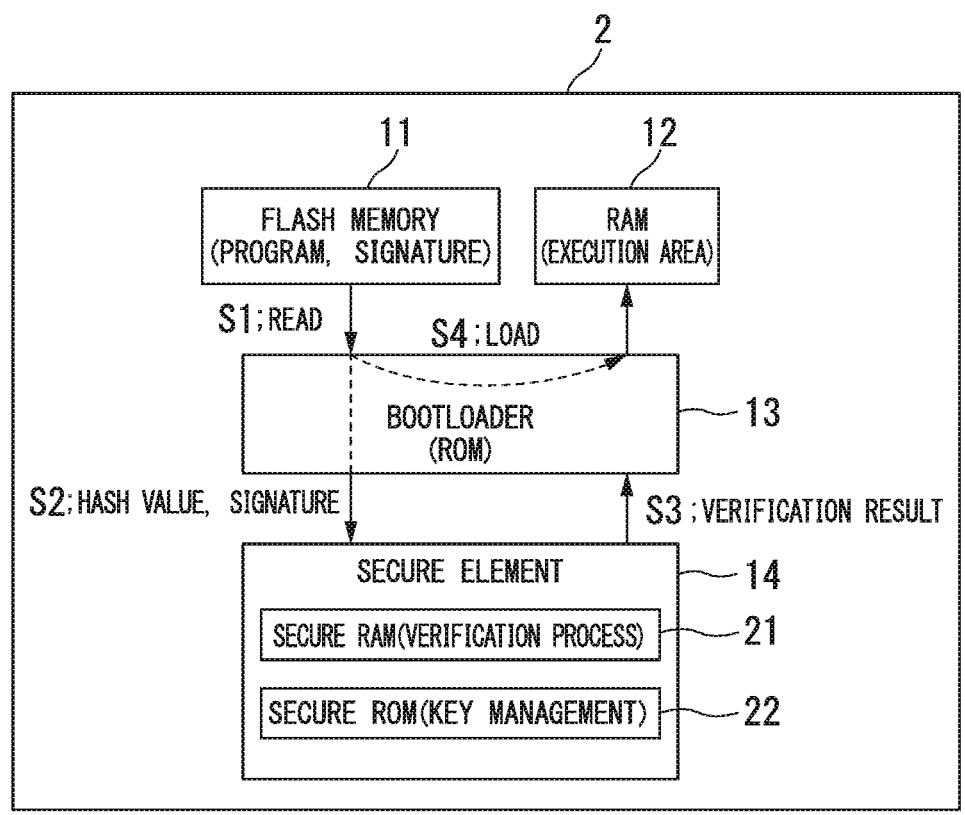
FIG. 8 is a sequence chart of a boot process according to the second embodiment of the present invention.

Next, a boot process according to the present embodiment will be described with reference to FIG. 8. FIG. 8 is a sequence chart concerning the boot process of the present embodiment. The process of FIG. 8 is started at a power-on event of MCU_2.

(Step S1)

The bootloader 13 reads a computer program and its signature from the flash memory 11. Next, the bootloader 13 calculates a hash value for the read computer program.

(Step S2)

The bootloader 13 sends to the secure element 4 the calculated hash value and the signature read from the flash memory 11.

(Step S3)

In the secure element 14, the verifier 23 verifies whether the value of a signature received from the bootloader 13 matches the hash value received from the bootloader 13 by use of the signature verification key held in the secure ROM_22. In the verification process, the secure RAM_21 is used for a temporary storage area of data applied to the verification process. Upon successful verification, the secure element 14 notifies verification success to the bootloader 13.

(Step S4)

Upon receiving a notice of verification success from the secure element 14, the bootloader 13 loads the computer program, which is read from the flash memory 14 in step S1, to the RAM_12. Thus, the CPU_10 is able to execute the computer program loaded into the RAM_12.

Without receiving a notice of verification success from the secure element 14 (for example, without receiving a notice of verification success from the secure element 14 in a predetermined time being elapsed after transmission of step S2 or upon receiving a notice of verification failure from the secure element 14), the bootloader 13 does not load the computer program, which is read from the flash memory 11 in step S1, to the RAM_12. In this case, the bootloader 13 stops activating MCU_2.

According to the boot process of the present embodiment, it is possible to safely validate authenticity of computer programs executed by the CPU_10 by way of signature verification of the secure element 14. Thus, it is possible to load authentic computer programs into the RAM_12 serving as an execution area of the CPU_10; hence, it is possible to normally activate MCU_2 upon executing computer programs, loaded into the RAM_12, with the CPU 10. In the communication network system 1 of the present embodiment, it is possible to achieve secure boot for validating authenticity of computer programs (e.g. operating systems (OS) etc.) for each MCU_2 at its activation. For example. Non-Patent Literature 5 discloses a secure boot.

Figure 9:
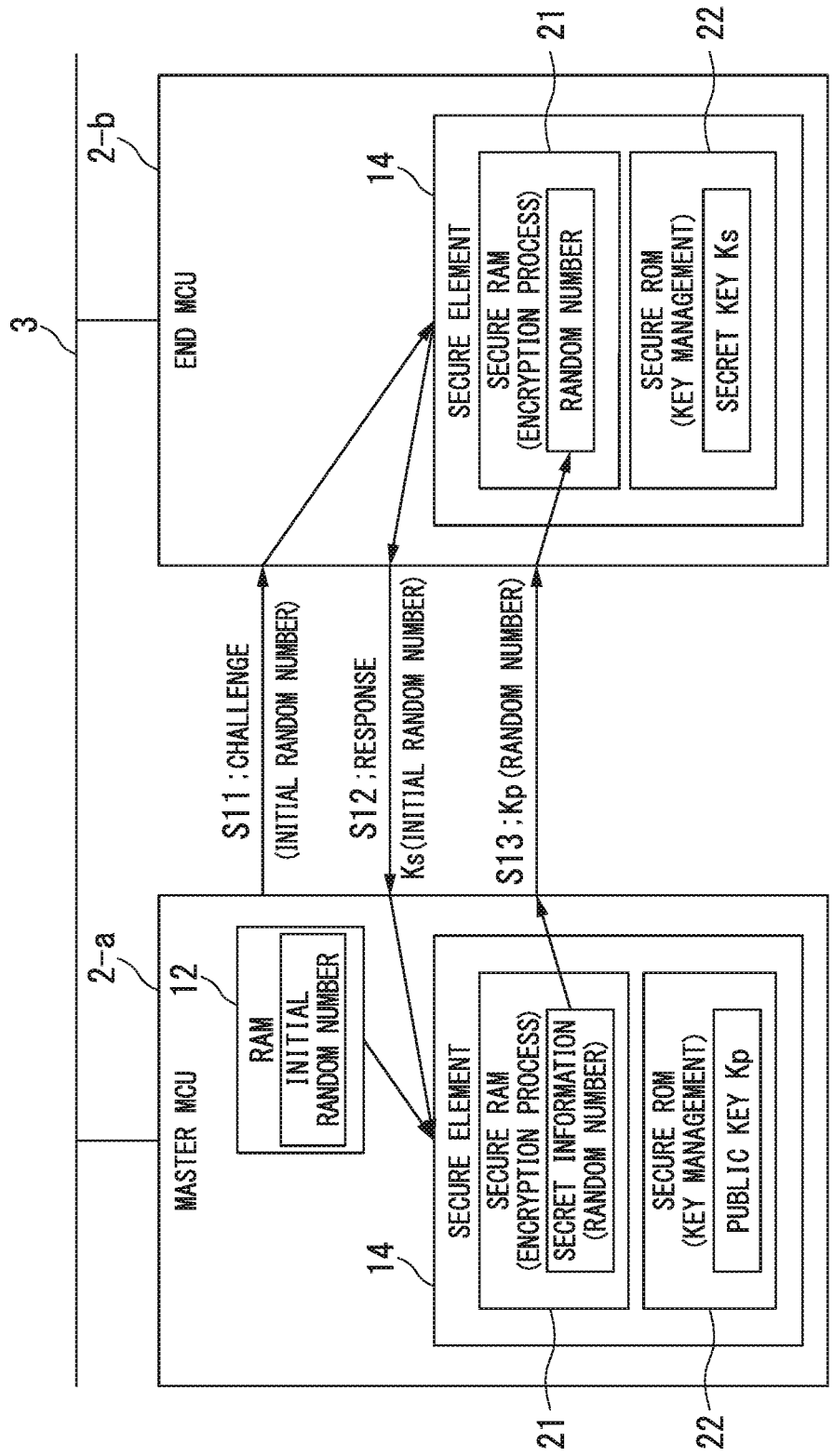
FIG. 9 is a sequence chart of an encryption process according to the second embodiment of the present invention.

Next, the encryption process of the present embodiment will he described with reference to FIG. 9. FIG. 9 is a sequence chart concerning the encryption process of the present embodiment. The process of FIG. 9 is started on a predetermined trigger.

The following description refers to an example of situation that random numbers serving as secret information are safely notified from the maser MCU_2-a to the end MCU_2-b. In this connection, data transmission between the master MCU_2-a and the end MCU_2-b is carried out through the communication bus 3.

(Step S11)

The master MCU_2-a sends a challenge, i.e. an initial random number held in its own RAM_12, to the end MCU_2-b. Additionally, the master MCU_2-a transfers the initial random number, which is sent to the end MCU_2-b as a challenge, to its own secure element 14.

(Step S12)

The end MCU_2-b transfers the challenge, i.e. the initial random number, received from the master MCU_2-a to its own secure element 14. The encryption processor 24 of the end MCU_2-b encrypts the initial random number by use of a secret key Ks held in its own secure ROM_22. In the encryption process, the secure RAM_21 of the end MCU_2-b is used for a temporary storage area of data applied to the encryption process. Next, the end MCU_2-b sends encryption data Ks (i.e. the initial random number), representing the encrypted initial random number, as a response to the master MCU_2-a.

(Step S13)

The master MCU_2-a transfers the encryption data. Ks (i.e. the initial random number), i.e. a response received from the end. MCU_2-b, to its own secure element 14. The encryption processor 24 of the master MCU_2-a decrypts the encryption data Ks (i.e. the initial random number) by use of a public key Kp of the end MCU_2-b held in its own secure ROM_22. Next, the encryption processor 24 of the master MCU_2-a verifies whether decryption data, which is obtained via decryption, matches the initial random number, i.e. the challenge which is sent to the end MCU_2-b in step S11. In the decryption process and the verification process, the secure RAM_21 of the master MCU_2-a is used for a temporary storage area of data applied to each of the decryption process and the verification process. Upon verification success, it is determined that the end MCU_2-b is verified successfully.

Upon verification success, the encryption processor 24 of the master MCU_2-a generates and encrypts a random number serving as secret information by use of the public key Kp of the end MCU_2-b held in its own secure ROM_22. In the random number generation process and the encryption process, the secure RAM_21 of the master MCU_2-a is used for a temporary storage area of data applied to each of the random number generation process and the encryption process. Next, the master MCU_2-a sends the encryption data Kp (i.e. the random number), representing the encrypted secret information (i.e. the random number), to the end MCU_2-b.

The end MCU_2-b transfers the encryption data Kp (i.e. the random number), which is received from the master MCU_2-a, to its own secure element 14. The encryption processor 24 of the end MCU_2-b decrypts the encryption data Kp (i.e. the random number) by use of the secret key Ks held in its own secure ROM_22. In the decryption process, the secure RAM_21 of the end MCU_2-b is used for a temporary storage area of data applied to the decryption data. The decryption process reproduces the random number, representing the secret information, from the encryption data Kp (i.e. the random number). The reproduced random number is safely held by the secure RAM_21 of the end MCU_2-b.

According to the encryption process of the present embodiment, it is possible to safely carry out the encryption process (i.e. the encryption process or the decryption process) for the information exchanged between multiple units of MCU_2 (i.e. the master MCU_2-a and the end MCU_2-b in the above example). Thus, it is possible to achieve safety in the information exchanged between multiple units of MCU_2.

Owing to the challenge-response procedure based on the encryption process, it is possible for the master MCU_2-a to reliably carry out authentication. Thus, it is possible for the master MCU_2-a to safely send secret information to the authenticated end MCU_2-b via the encryption process. The secret information can he used as the foregoing secret information in the first embodiment. In the above example, it is possible to safely transmit any random number, serving as secret information, from the master MCU_2-a to the end MCU_2-b.

Figure 10:
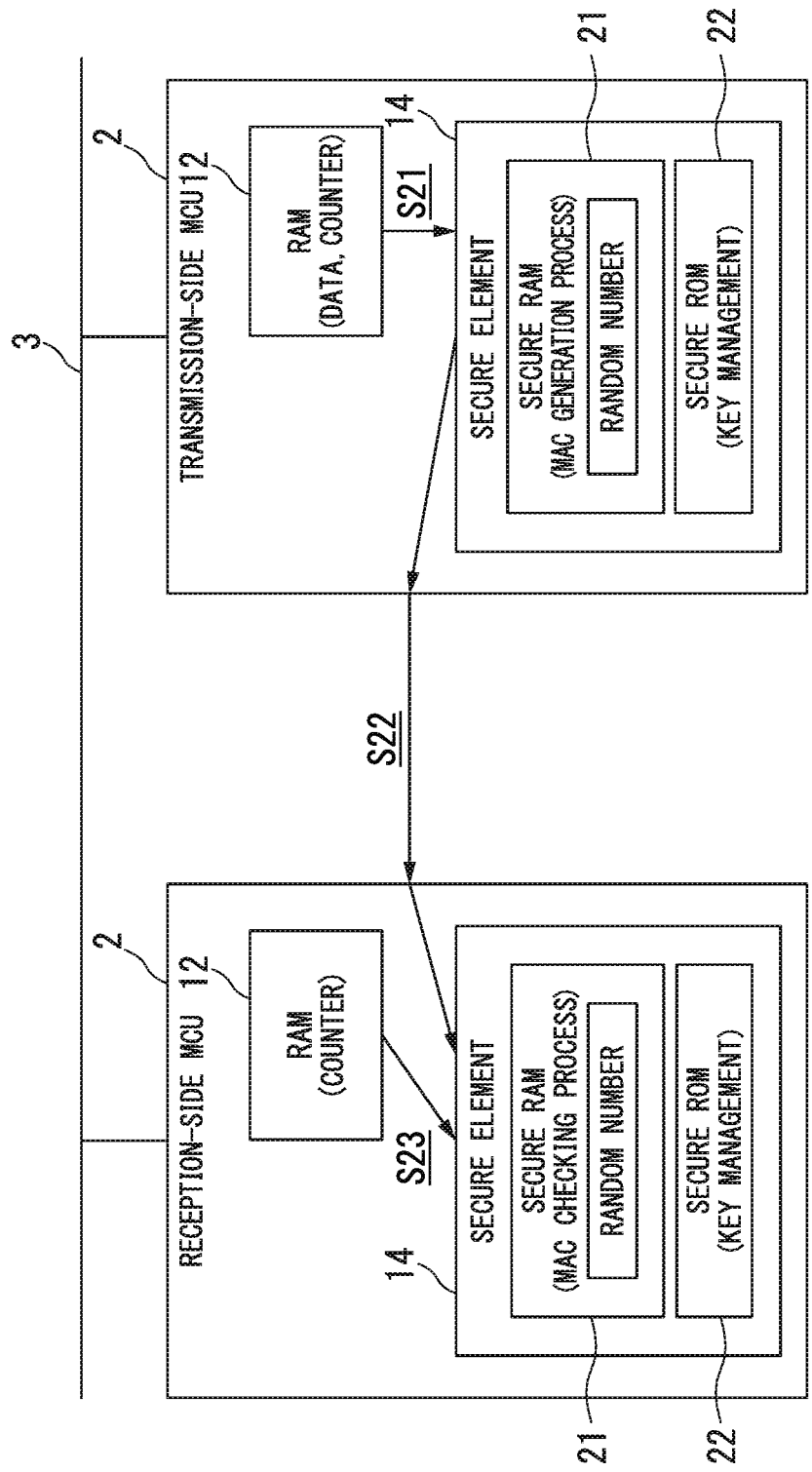
FIG. 10 is a sequence chart used to explain a MAC generating process and a MAC checking process according to the second embodiment of the present invention.

Next, the MAC generation process and the MAC checking process according to the present embodiment will he described with reference to FIG. 10. FIG. 10 is a sequence chart used to explain the MAC generation process and the MAC checking process according to the present embodiment.

According to the encryption process of FIG. 9, a certain random number serving as secret information is safely transmitted from the master MCU_2-1 to the authenticated end MCU_2-b. Each of the masterMCU_2-a and the end MCU_2-b stores the random number serving as the secret information in its own secure RAM_21. The secure RAM_21, serving as the secret information storage unit 117 in the first embodiment, safely holds the random number (i.e. the secret information).

In FIG. 10, the transmission-side MCU_2 operates as a transmission node. In this connection, the transmission-side MCU_2 may refer to either the master MCU_2-a or the end MCU_2-b. The reception-side MCU_2 operates as a reception node. The reception-side MCU_2 may refer to either the master MCU_2-a or the end MCU_2-b. The transmission-side MCU_2 holds transmission data and its transmission count value in the RAM_12. The reception-side MCU_2, holds a reception count value in the RAM_12. The process of FIG. 10 is started upon generating a CAN frame being transmitted from the transmission-side MCU_2.

(Step S21)

The transmission-side MCU_2 transfers transmission data and its transmission count value from the RAM_12 to the secure RAM_21. The secure element 14 of the transmission-side MCU_2 generates MAC by use of a random number (or secret information), transmission data and its transmission count value held in the secure RAM_21. The MAC generation method is identical to the foregoing one in the first embodiment. Herein, MAC is safely generated in the secure RAM_21. As a result of MAC generation, a 15-bit bit string (i.e, an extracted bit string of MAC for a CRC section) acted from a bit string of a MAC value and then transferred from the secure RAM_21 to the RAM_12.

(Step S22)

The transmission-side MCU_2 stores transmission data, which is transferred from the RAM_12 to the secure RAM_21 in step S21, in a data section of a CAN frame while storing an extracted bit string of MAC for a CRC section, which is transferred from the secure RAM_21 to the RAM_12 in step S21, in CRC section of a CAN frame. The transmission-side MCU_2 transmits the CAN frame onto the communication bus 3. The CAN frame is received by the reception-side MCU_2 through the communication bus 3.

(Step S23)

The reception-side MCU_2 holds the CAN frame being received through the communication bus 3 in the RAM_12. The reception-side MCU_2 transfers reception data, which is retrieved from the data section of the CAN frame held in the RAM_12, and a received MAC value, which is retrieved from the CRC section of the CAN frame, to the secure RAM_21. Additionally, the reception-side MCU_2 transfers a reception count value, associated to ID stored in an ID section of the CAN frame held in the RAM_12, from the RAM_12 to the secure RAM_21.

Next, the secure element 14 of the reception-side MCU_2 generates MAC by use of a random number (or secret information), reception data, and its reception count value held in the secure RAM_21. The MAC generation method is identical to the foregoing one in the first embodiment. Herein, MAC is generated safely in the secure RAM_21. As a result of MAC generation, a 15-bit checking bit string is extracted from a bit string of a calculated MAC value. Next, the secure element 14 of the reception-side MCU_2 determines whether the received MAC value held in the secure RAM_21 matches the checking bit string. When the determination result indicates unmatched, rechecking is carried out in a similar manner as the first embodiment.

As described above, the present embodiment is able to generate and check MAC by use of the random number (or secret information) safely held by the secure RAM_21. Thus, it is possible to improve reliability when checking CAN frames.

Hereinabove, the present invention is described by way of the foregoing embodiments with reference to the drawings. However, concrete configurations are not necessarily limited to the foregoing embodiments; hence, the present invention may embrace any design change which does not deviate from the essence of the invention.

In the foregoing embodiments, for example, a single unit of MCU_2 shares a transmission-node function and a reception-node function; but a single unit of MCU_2 may solely achieve a transmission-node function, or a single unit of MCU_2 may solely achieve a reception-node function.

Alternatively, a single unit of MCU_2 may be configured using a single semiconductor device. This may further improve safety since a single unit of MCU_2 is formed on a single chip having a single semiconductor integrated circuit.

As secure elements, for example, it is possible to adopt eSIM (Embedded Subscriber Identity Module) or SIM (Subscriber Identity Module) used for wireless communications. Herein, eSIM and SIM represent one type of computer, which is designed to achieve a desired function using a computer program. As secure elements, for example, it is possible to adopt tamper-resistant encryption processing chips. For example, encryption processing chips called TPM (Trusted Platform Module) have been known as tamper-resistant encryption processing chips. For example, Non-Patent Literature 6 discloses TPM.

The foregoing embodiments are applicable to various types of vehicles such as bicycles, motorcycles, and railway vehicles.

The foregoing embodiments are described by taking an example of a communication network system installed in each vehicle which is one type of communication network system according to the present invention; however, the present invention is applicable to communication network systems in various fields. For example, it is possible to adopt MCU_2 as a controller for controlling each home appliance such that user's home appliances each having MCU_2 are connected together with home networks. Alternatively, it is possible to adopt MCU_2 as a smart meter such that smart meters each having MCU_2 are connected to communication networks.

[Embodiment 1 for Another Configuration of Data Frame]

Figure 12:
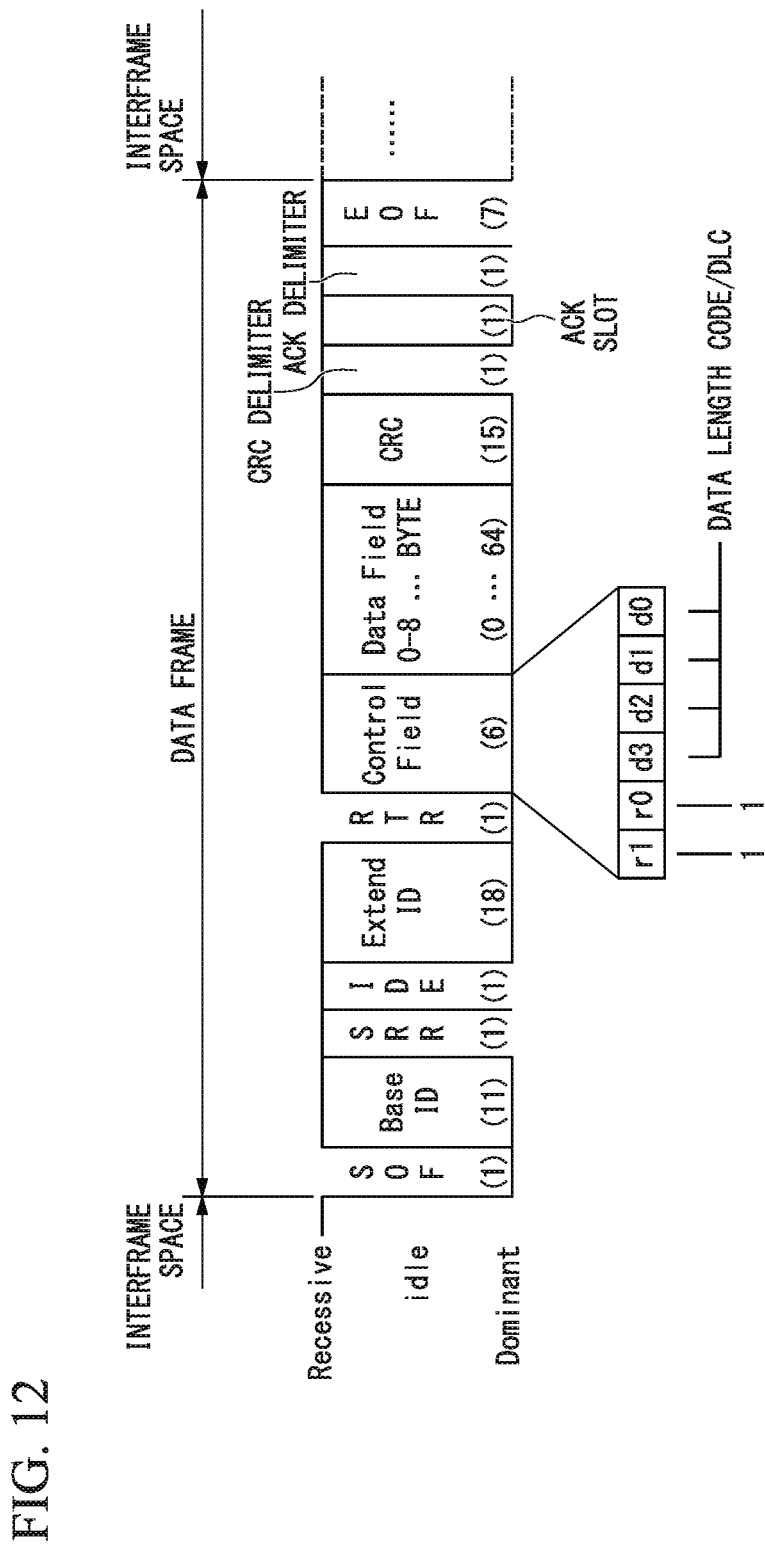
FIG. 12 is a configuration diagram showing a data frame of an extended format in CAN.

Now, Embodiment 1 for another configuration of a data frame will be described below FIG. 12 is a configuration diagram of a data frame having an extended format of CAN (see NON-Patent Literature 7). As shown in FIG. 12, a data frame having an extended format of CAN includes an 11-bit base ID (Base ID) fields and an 18-bit extended ID (Extend ID) field. The extended format may provide an ID storage area maximally having 29 bits corresponding to a combination of the base ID field and the extended ID field. Embodiment 1 is designed to store MAC in a 29-bit area combining the base ID field and the extended ID field. Hereinafter, A MAC storing method for storing MAC in a 29-bit area combining the base ID field and the extended ID field will be described with reference to Examples 1, 2, 3.

(Example 1 for MAC Storing Method)

Figure 13:
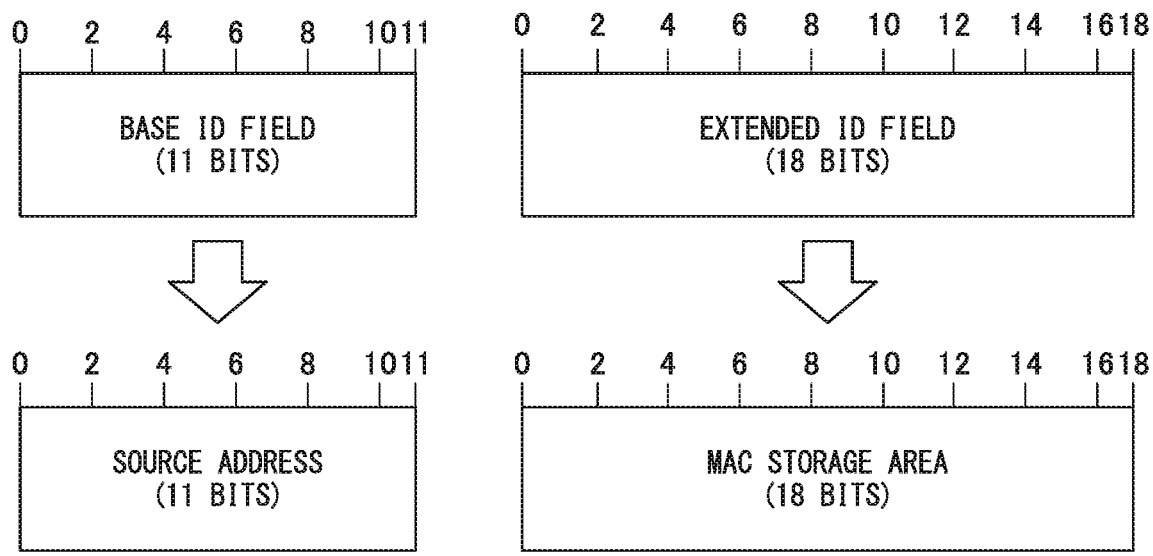
FIG. 13 is an explanatory diagram showing Example 1 of a MAC storing method according to one embodiment of the present invention.

As shown in FIG. 13, Example 1 for a MAC storing method uses an 18-bit extended ID field for a MAC storing area. The base If) field is used for an ID storing area. In FIG. 13, the base ID field stores a source address representing an address of MCU_2 serving as a source of transmitting a data frame.

(Example 2 for MAC Storing Method)

Example 2 for a MAC storing method is a method for storing MAC in a 29-bit area combining the base ID field and the extended ID field when the 29-bit area is used to store a source address representing an address of MCU_2 serving as a source of transmitting a data frame, a destination address representing an address of MCU_2 serving as a destination of receiving a data frame, and a source type (see Non-Patent Literature 8). FIG. 14 is an explanatory diagram showing Example 2 for a MAC storing method according to one embodiment of the present invention.

As shown in FIG. 14, an 8-bit source address is converted into a 7-bit source address with reference to a conversion compression table. Similarly, an 8-bit destination address is converted into a 7-bit destination address with reference to a conversion/compression table. An 8-bit destination type is converted into a 2-bit destination type with reference to a conversion/compression table. Herein, a precondition should be provided such that an actually-used source address can be expressed using 7 bits in comparison with an original source address consisting of 8 bits. Similarly, a precondition should be provided such that an actually-used destination address can be expressed using 7 bits in comparison with an original destination address consisting of 8 bits. Similarly, a precondition should be provided such that an actually-used destination type can be expressed using 2 bits in comparison with an original destination type consisting of 8 bits. In this connection, each conversion/compression table is provided in advance.

In the above, it is possible to sum up 8 bits unused in total since an 8-bit source address is expressed using 7 bits, an 8-bit destination address is expressed using 7 bits, and an 8-bit destination type is expressed using 2 bits. As shown in FIG. 14, it is possible to use a total of 13 bits, combining unused 8 bits and 5 bits in an original free space, for a MAC storing area.

The reception side should provide an inverse-conversion/expansion table as a countermeasure for each conversion/compression table. The reception side inversely converts its received data into original data such that a 7-bit source address is reconverted into an 8-bit source address, a 7-bit destination address is reconverted into an 8-bit destination address, a 2-bit destination type is reconverted into an 8-bit destination type.

(Example 3 for MAC Storing Method)

Figure 15:
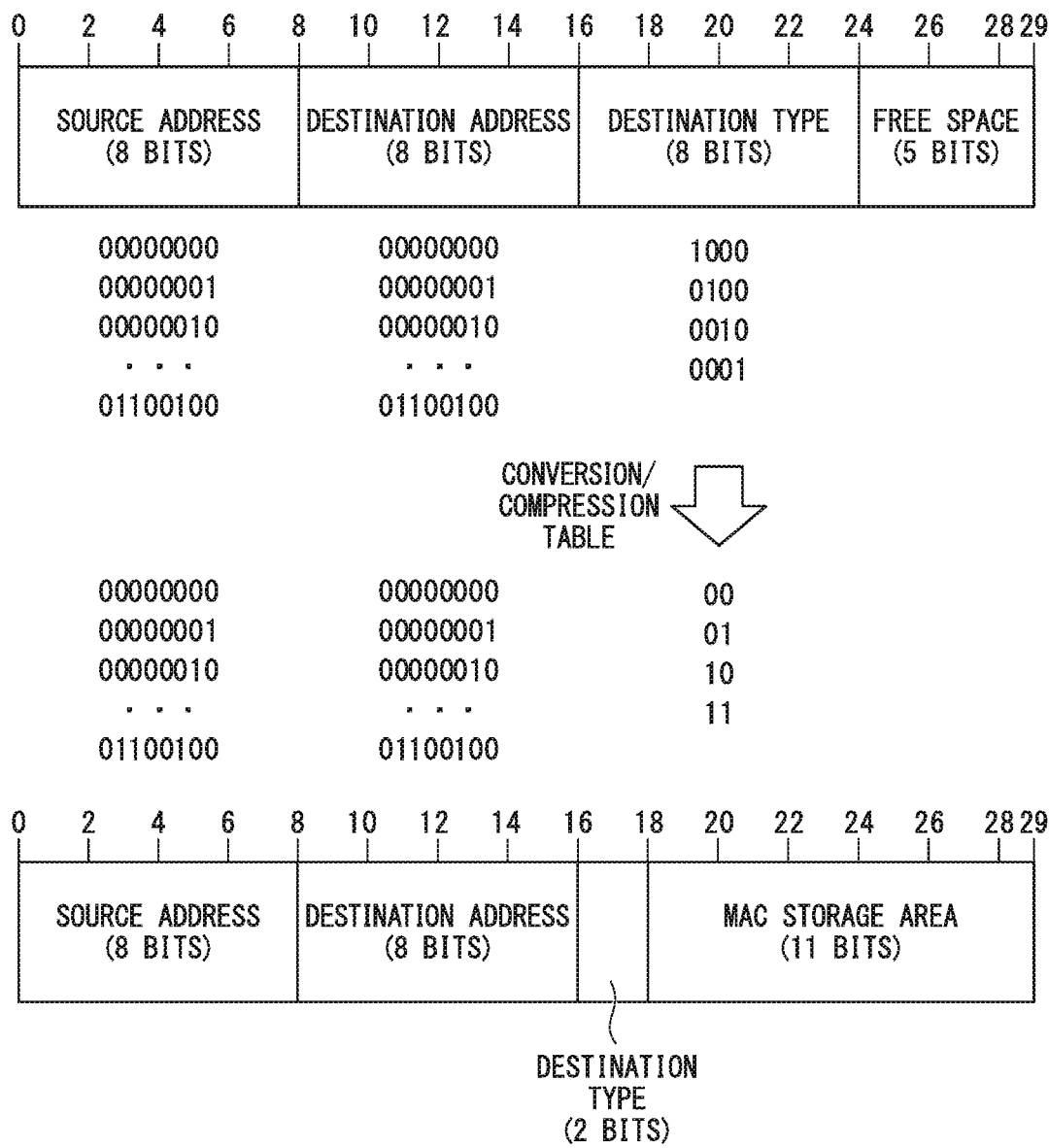
FIG. 15 is an explanatory diagram showing Example 3 of a MAC storing method according to one embodiment of the present invention.

Similar Example 2 for a MAC storing method. Example 3 for a MAC storing method is a MAC storing method for storing MAC in a 29-bit area combining the base ID field and the extended ID field when the 29-bit area is used to store a source address representing an address of MCU_2 serving as a source of transmitting a data frame, a destination address representing an address of MCU_2 serving as a destination of receiving a data frame, and a destination type. FIG. 15 is an explanatory diagram showing Example 3 for a MAC storing method according to one embodiment of the present invention.

As shown in FIG. 15, Example 3 for a MAC storing method is designed to store an 8-bit source address and an 8-bit destination address without converting them. An 8-bit destination type is converted into a 2-bit destination type with reference to a conversion/compression table. Herein, a precondition should be provided such that an actually-used destination type can be expressed using 2 bits in comparison with an original destination type consisting of 8 bits. In this connection, a conversion/compression table is provided in advance.

The conversion of an 8-bit destination type into a 2-bit destination type results in 6 bits unused. As shown in FIG. 15, it is possible to use a total of 11 bits, combining the unused 6 bits and 5 bits of an original free space, for a MAC storing area.

The reception side should provide an inverse-conversion/expansion table as a countermeasure for a conversion/compression table concerning a destination type. The reception side inversely converts its received 2-bit destination type into an 8-bit destination type with reference to the inverse-conversion/expansion table.

[Embodiment 2 for Another Configuration of Data Frame]

Figure 16:
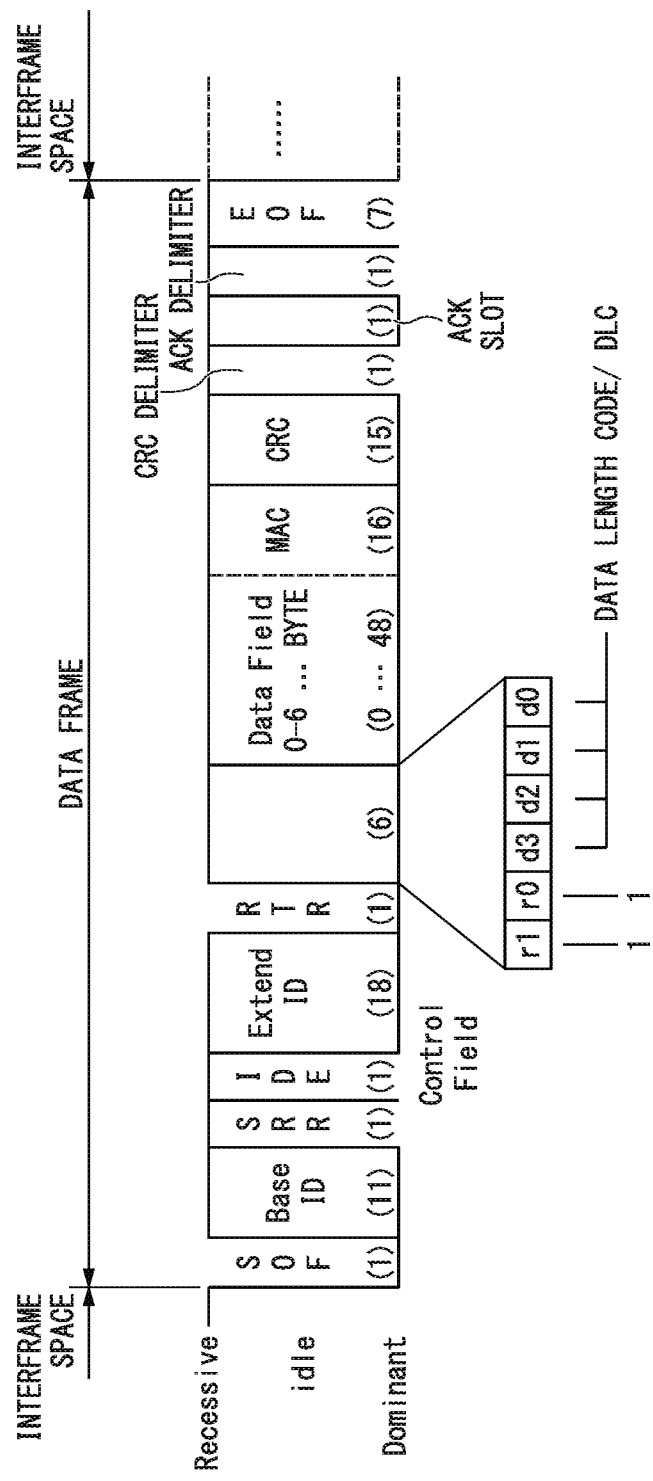
FIG. 16 is a configuration diagram showing another example of a data frame according to one embodiment of the present invention.

Now, Embodiment 2 for another configuration of data frame will be described below. FIG. 16 is a configuration diagram showing another example of a data frame according to one embodiment of the present invention. In the data frame shown in FIG. 16, numbers in parentheses described in fields indicate bit counts of information stored in fields.

FIG. 16 shows a data frame configuration which is partially limited in comparison with a data frame configuration having an extended format of Can. Herein, MAC is stored in a data section (Date Field) of a data frame shown in FIG. 16. MAC is stored at a predetermined position in a data section. For example, it is possible to store MAC at a top portion or a last portion in a data section. It is assumed that MAC stored in the last portion of a data section may hardly affect the existing usage of a data section. In case of FIG. 16, MAC is stored in the last portion of a data section. In case of FIG. 16, MAC has a data length of 16 bits. For this reason, as shown in FIG. 16, the data section provides maximally 48 bits for storing other data other than MAC stored in the data section. The data frame shown in FIG. 16 is similar to an extended format of CAN except for storing MAC in the data section.

[Other Examples of MAC Data Stored in Data Frame]

Figure 17:
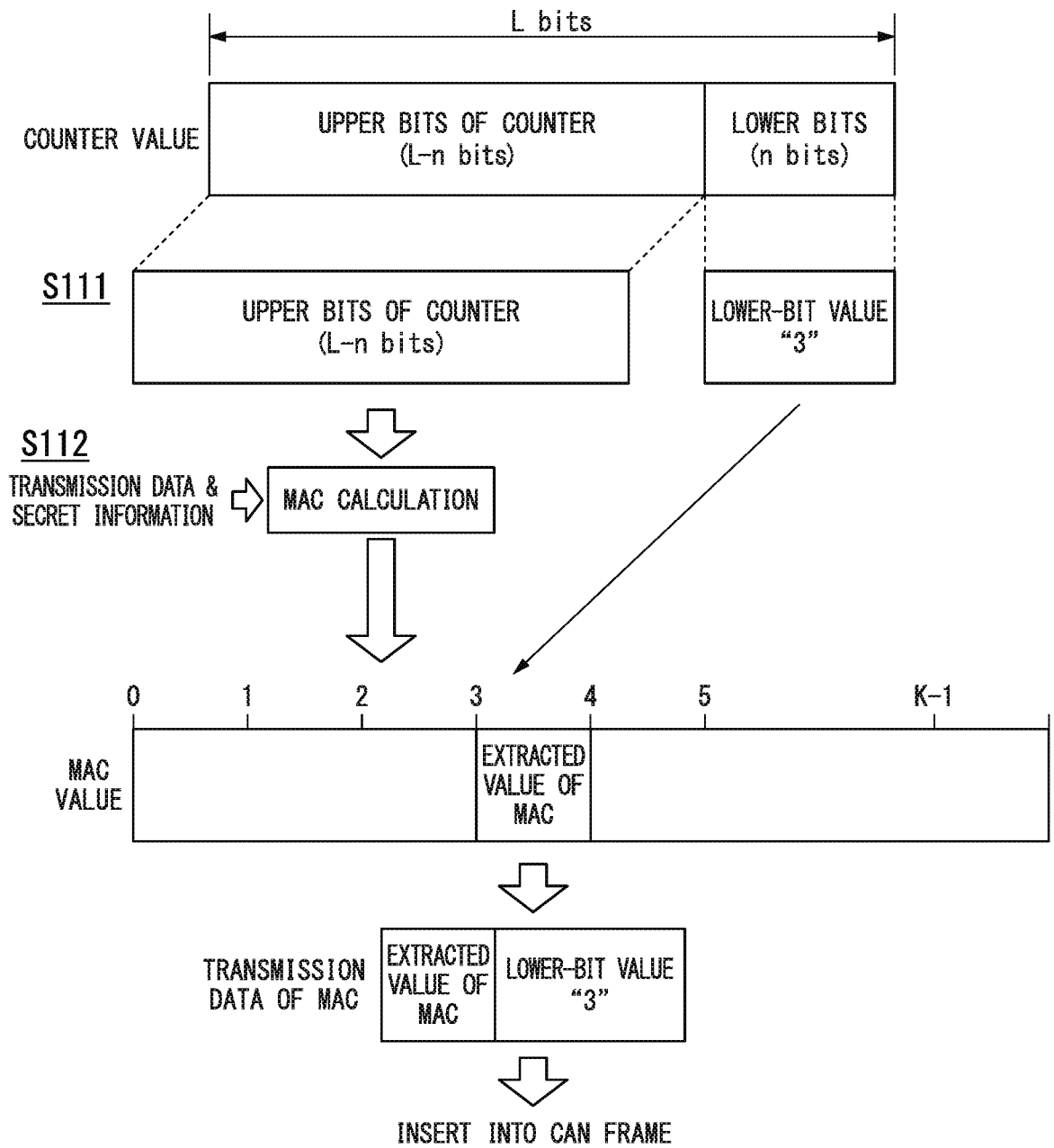
FIG. 17 is an explanatory diagram showing another example of MAC data stored in a data frame according to one embodiment of the present invention.
Figure 18:
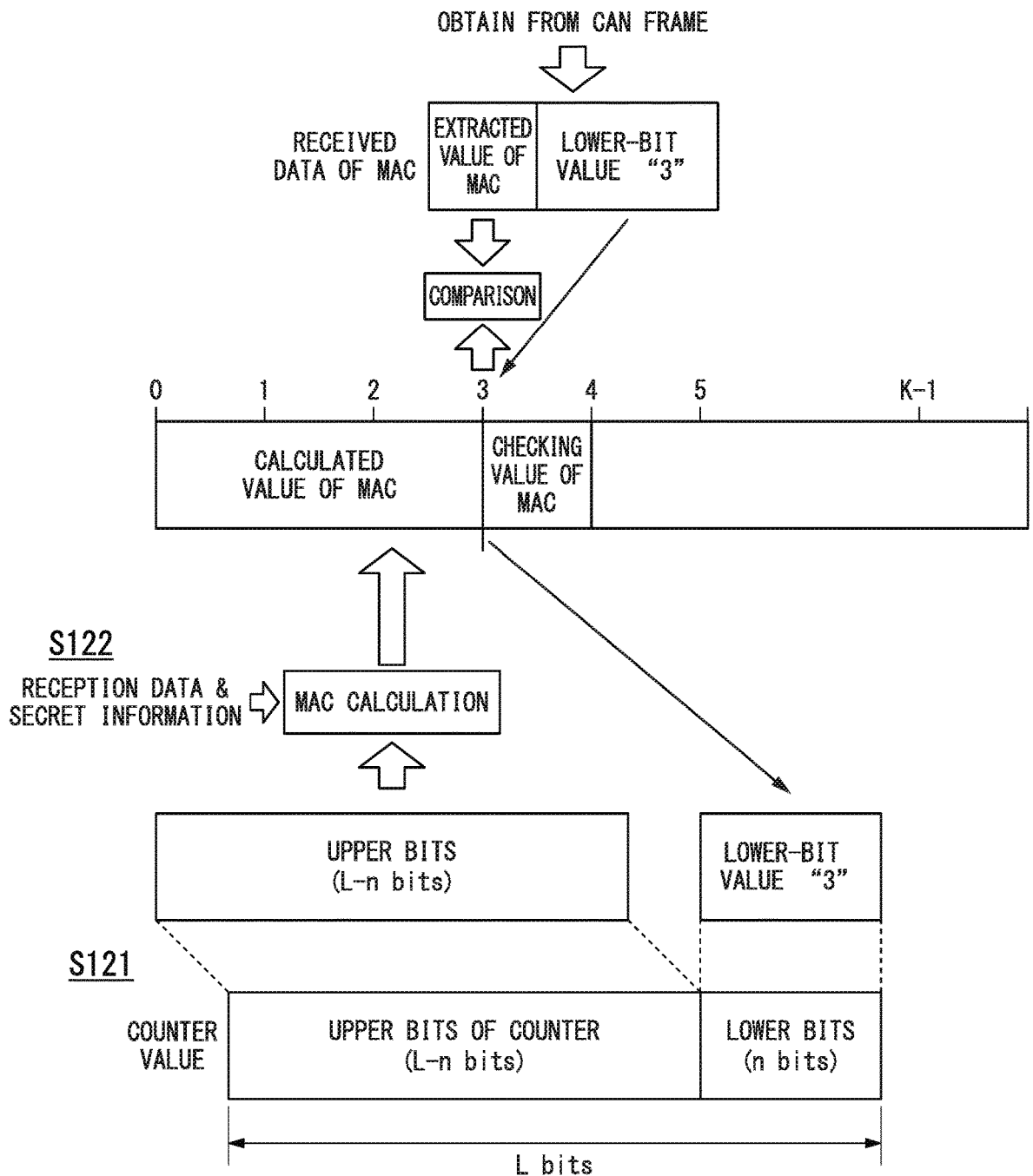
FIG. 18 is an explanatory diagram showing a further example of MAC data stored in a data frame according to one embodiment of the present invention.

FIGS. 17 and 18 are explanatory diagrams showing other examples of MAC data stored in data frames according to one embodiment of the present invention. For example, a data frame configuration is exemplified by a CAN frame shown in FIG. 3. First, the operation of a transmission node storing MAC data in a CAN frame will be described with reference to FIG. 17. In FIG. 17, the same steps as the foregoing steps of FIG. 4 are denoted using the same reference signs; hence, descriptions thereof will be omitted here.

The transmission process of FIG. 17 is started upon generating a CAN frame being transmitted by the transmitter 111. First, steps S111 and S112 are carried out. Steps S111 and S112 are identical to those shown in FIG. 4. MAC values are calculated in steps S111 and S112.

Next, the MAC generator 114 extracts a bit string having a predetermined bit count an extracted value of MAC), which should be stored in a CAN frame, from a MAC value which is calculated in step S112. The extracted MAC value is specified by a value represented by predetermined lower bits (with a bit count n) other than extracted upper bits within a bit string (with a bit count L) of a transmission count value obtained in step S111. In case of FIG. 17, lower bits (with a bit count n) represents the value "3". Thus, it is possible to extract one portion of a bit string of a MAC value (i.e. an extracted value of MAC) specified by the value "3".

Next, the MAC generator 114 generates transmission data of MAC based on the extracted value of MAC, which is extracted from the MAC value, and positional information concerning the extracted value of MAC located in the MAC value. In case of FIG. 17, the positional information concerning the extracted value of MAC located in the MAC value is the value "3" represented by predetermined lower bits other than the extracted upper bits in a bit string of a transmission count value obtained in step S111. In case of FIG. 17, the transmission data of MAC is the extracted value of MAC followed by the lower-bit value "3". The transmission data of MAC is stored in a CAN frame. The transmission data of MAC is stored in a CRC section of a CAN frame shown in FIG. 3.

The configuration for the transmission data of MAC is determined in advance. In the case of a CAN frame shown in FIG. 3, a CRC section having 15 bits is used as a location of storing MAC data; hence, the transmission data of MAC should have a data length of 15 bits. In this connection, it is possible to add the positional information, concerning the extracted value of MAC located in the MAC value, prior to the extracted value of MAC in the transmission data of MAC. The positional information concerning the extracted value of MAC located in the MAC value may be represented using the entirety of predetermined lower bits other than the extracted upper bits within a bit string of a transmission count value obtained in step S111, or the positional information may be represented using part of lowest bits within predetermined lower bits.

Next, the transmitter 111 stores transmission data (which is used for calculating a MAC value in step S112) in a data section of a CAN frame while storing transmission data of MAC in a CRC section of a CAN frame. The transmitter 111 transmits the CAN frame onto the communication bus 3. The counter 115 holds a transmission count value which is increased by 1 due to transmission of the CAN frame.

Next, the operation of a reception node receiving an CAN frame will be described with reference to FIG. 18. In FIG. 18, the steps identical to the foregoing steps in FIG. 5 are denoted by the same reference signs; hence, descriptions will be omitted here.

The reception process of FIG. 18 is started when the receiver 112 receives a CAN frame.

First, steps S121 and S122 are carried out. The steps S121 and S122 are identical to the foregoing steps of FIG. 5. Next, the MAC checking part 116 retrieves MAC data (or received MAC data) from a CRC section of a CAN frame received by the receiver 112. The MAC checking part 116 obtains from the received. MAC data an extracted value of MAC and positional information concerning the extracted value of MAC located in the MAC value. In case of FIG. 18, the positional information concerning the extracted value of MAC located in a MAC value is set to "3".

Next, the MAC checking part 116 obtains a checking value of MAC, used for checking of MAC, from a bit string (i.e. a calculated MAC value) of a MAC value, which is calculated in step S122, based on the positional information "3" obtained from the received MAC data. Next, the MAC checking part 116 compares the extracted value of MAC, obtained from the received MAC data, and the checking value of MAC, obtained from the calculated MAC value, so as to determine whether or not those values match each other. When the determination result indicates that those value do not match each other, the MAC checking part 116 obtains a new checking value of MAC from the calculated MAC value while changing a position of retrieving a new checking value of MAC from the calculated MAC value, thus determining whether or not the new checking value of MAC matches the extracted value of MAC. For example, the MAC checking part 116 obtains a new checking value of MAC from the calculated MAC value while changing a position of retrieving a new checking value of MAC from the calculated MAC value by 1 bit, thus determining whether or not the new checking value matches the extracted value of MAC.

When the checking value of MAC matches the extracted value of MAC, the MAC checking part 116 issues a counter synchronization instruction by notifying to the counter 115 a binary value (i.e. a value of lower bits) representing the position of retrieving the checking value of MAC, matched with the extracted value of MAC, from the calculated MAC value. According to the counter synchronization instruction, the counter 115 changes a lower-bit value of a reception count value with its notified lower-bit value. In case of FIG. 18, the lower-bit value, representing the position of retrieving the checking value of MAC, matched with the extracted value of MAC, from the calculated MAC value is set to "3". Therefore, the MAC checking part 116 issues a counter synchronization instruction by notifying the lower-hit value "3" to the counter 115.

According to the counter synchronization instruction, the counter 115 changes the lower-bit value of a reception count value with the notified lower-bit value "3". The reception count value subjected to counter synchronization is a reception count value associated to ID stored in an ID section of a CAN frame received by the receiver 112. Thus, it is possible to synchronize a reception count value of a reception node associated to ID with a transmission count value of a transmission node associated to ID.

According to MAC data stored in the data frames shown in FIGS. 17 and 18, it is possible to improve a MAC checking efficiency at a reception node since the reception node is notified of positional information, representing a position of retrieving a checking value of MAC from a calculated MAC value at the reception node, by a transmission node. For example, this makes it possible to achieve an effect of reducing time required for communications between multiple units of MCU_2.

[Other Examples of MAC]

As MAC, for example, it is possible to calculate Code MAC (CMAC). Herein, CMAC means MAC based on common key cryptography.

[Other Embodiment 1 of Encryption Processes]

Figure 19:
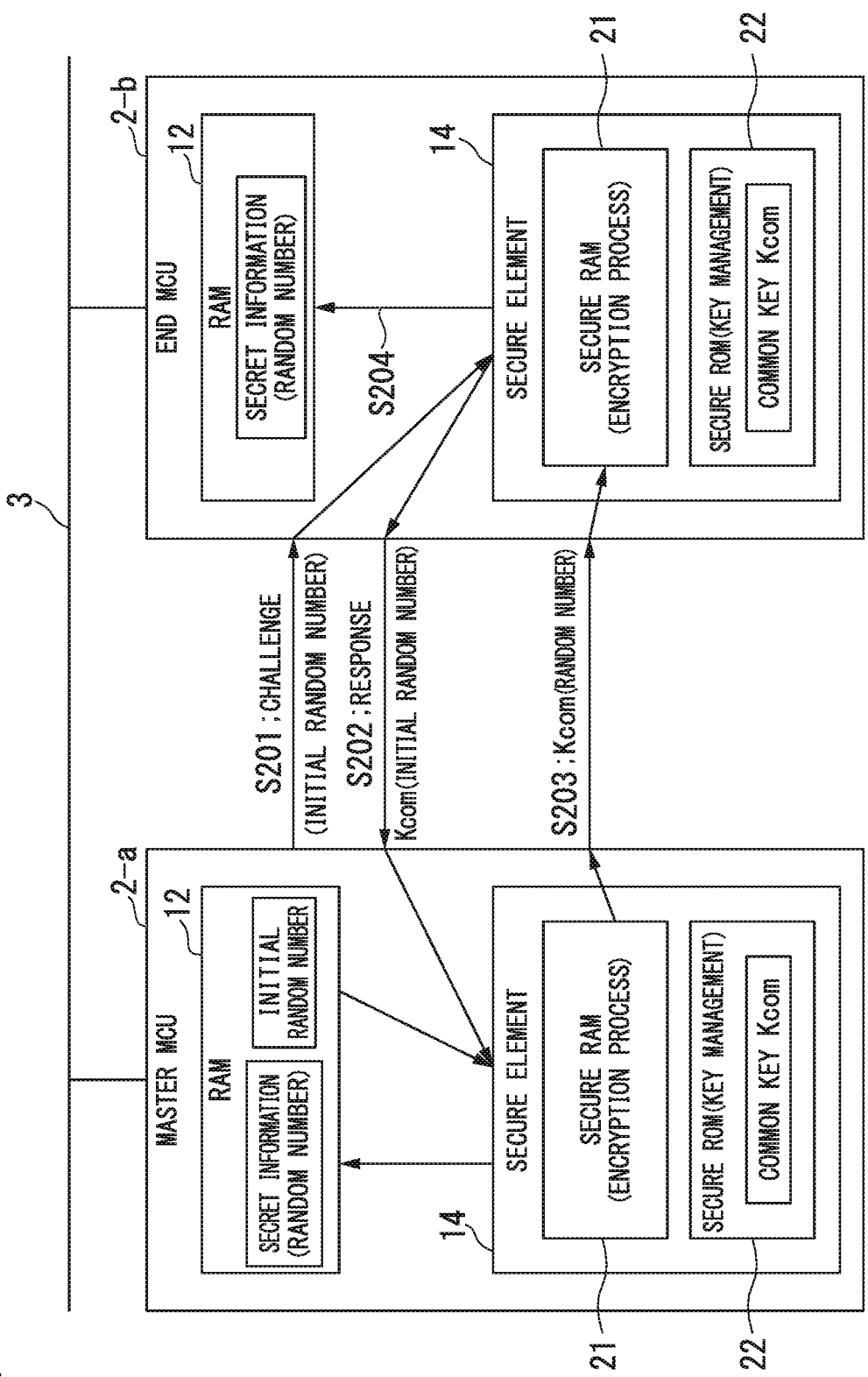
FIG. 19 is a sequence chart of an encryption process according to one embodiment of the present invention.

FIG. 19 is a sequence chart of an encryption process according to one embodiment of the present invention. Other Embodiment 1 of encryption processes will be described with reference to FIG. 19. Other Embodiment 1 of encryption processes is a variation of the second embodiment. Other Embodiment 1 of encryption processes employs a communication network system having the same configuration as the communication network system 1 of FIG. 7 according to the second embodiment; hence, for example, the communication network system is installed in a vehicle. According to Other Embodiment 1 of encryption processes, the same common key Kcom is stored in the secure ROM 22 installed in each of the master MCU_2-a and the end MCU_2-b. Herein, the common key is also called as a symmetric key.

The process of FIG. 19 is started by a predetermined trigger. The following description refers to the situation of safely notifying a random number, serving as secret information, from the master MCU_2-a to the end MCU_2-b. Data transmission/reception between the master MCU_2-a and the end MCU_2-b is carried out through the communication bus 3.

(Step S201)

The master MCU_2-a transmits a challenge, i.e. an initial random number which is generated and stored in its own RAM_12, to the end MCU_2-b. Additionally, the master MCU_2-a transfers the initial random number, i.e. the challenge which has been sent to the end MCU_2-b, to its own secure element 14.

(Step S202)

The end MCU_2-b transfers the initial random number, i.e. the challenge received from the master MCU_2-a, to its own secure element 14. The encryption processor 24 of the end MCU_2-b encrypts the initial random number by use of the common key Kcom held in its own secure ROM_22. In the encryption process, the secure RAM_21 of the end MCU_2-b is used for a temporary storage area of data subjected to the encryption process. Next, the end MCU_2-b transmits a response, i.e. encryption data Kcom (an initial random number) representing the encrypted initial random number, to the master MCU_2-a.

(Step S203)

The master MCU_2-a transfers the encryption data Kcom (an initial random number), i.e. a response received from the end MCU_2-b, to its own secure element 14. The encryption processor 24 of the master MCU_2-a decrypts the encryption data Kcom (an initial random number) by use of the common key Kcom held in its own secure ROM_22.

Next, the encryption processor 24 of the master MCU_2-*a* verifies whether decryption data, obtained by decryption, matches the initial random number which is transmitted to the end MCU_2-*b* as the challenge in step S201. In the decryption process and the verification process, the secure RAM_21 of the master MCU_2-*a* is used for a temporary storage area of data subjected to each of the decryption process and the verification process. Upon successful verification, it is determined that the master MCU_2-*a* has successfully authenticate the end MCU_2-*b*.

Instead of decrypting the encryption data Kcom (an initial random number) serving as the response, the master MCU_2-*a* may encrypt the initial random number, i.e. the response which is transmitted to the end MCU_2-*b* as the challenge in step S201, by use of the common key Kcom so as to verify whether the encryption data Kcom (an initial random number) matches the encryption data Kcom (an initial random number) serving as the response. In the encryption process and the verification process, the secure RAM_21 of the master MCU_2-*a* is used for a temporary storage area of data subjected to each of the encryption process and the verification process. Upon successful verification, it is possible that the master MCU_2-*a* has successfully authenticated the end MCU_2-*b*.

Upon successful verification, the encryption processor 24 of the master MCU_2-*a* generates a random number as secret information so as to encrypt the random number by use of the common key Kcom held in its own secure ROM_22. In the random number generating process and the encryption process, the secure RAM_21 of the mater MCU_2-*a* is used for a temporary storage area of data subjected to each of the random number generating process and the encryption process. Next, the master MCU_2-*a* transmits the encryption data Kcom (a random number), representing the encrypted secret information (a random number), to the end MCU_22-*b*.

The end MCU_2-*b* transfers the encryption data Kcom (a random number), received from the master MCU_2-*a*, to its own secure element 14. The encryption processor 24 of the end MCU_2-*b* decrypts the encryption data Kcom (a random number) by use of the common key Kcom held in its own secure ROM_22. In the decryption process, the secure RAM_21 of the end MCU_2-*b* is used for a temporary storage area of data subject to the decryption process. Owing to the decryption process, it is possible to obtain a random number serving as secret information from the encryption data Kcom (a random number).

(Step S204)

The end MCU_2-*b* stores the random number, i.e. the secret information obtained by its own secure element 14. In its own RAM_12. The master MCU_2-*a* stores the random number, i.e. the secret information transmitted to the end MCU_2-*b*, in its own RAM 12. Thus, both the master MCU_2-*a* and the end MCU_2-*b* are able to hold the same random number, i.e. the same secret information, therein.

According to Other Embodiment 1 of encryption processes, it is possible to safely carry out an encryption process (i.e. an encryption process or a decryption process) for information exchanged between multiple units of MCU_2 (i.e. the master MCU_2-*a* and the end MCU_2-*b* in the above example). Thus, it is possible to ensure safety in information exchanged between multiple units of MCU_2.

Owing to the challenge-response procedure using encryption processes, it is possible for the master MCU_2-*a* to reliably authenticate the MCU_2-*b*. Thus, it is possible for the master MCU_2-*a* to safely transmit secret information to the authenticated end MCU_2-*b* according to encryption processes. The secret information can be used as the foregoing secret information in the first embodiment. According to Other Embodiment 1 of encryption processes, it is possible for the master MCU_2-*a* to safely transmit random numbers, serving as secret information, to the end MCU_2-*b*.

[Other Embodiment 2 of Encryption Processes]

Figure 20:
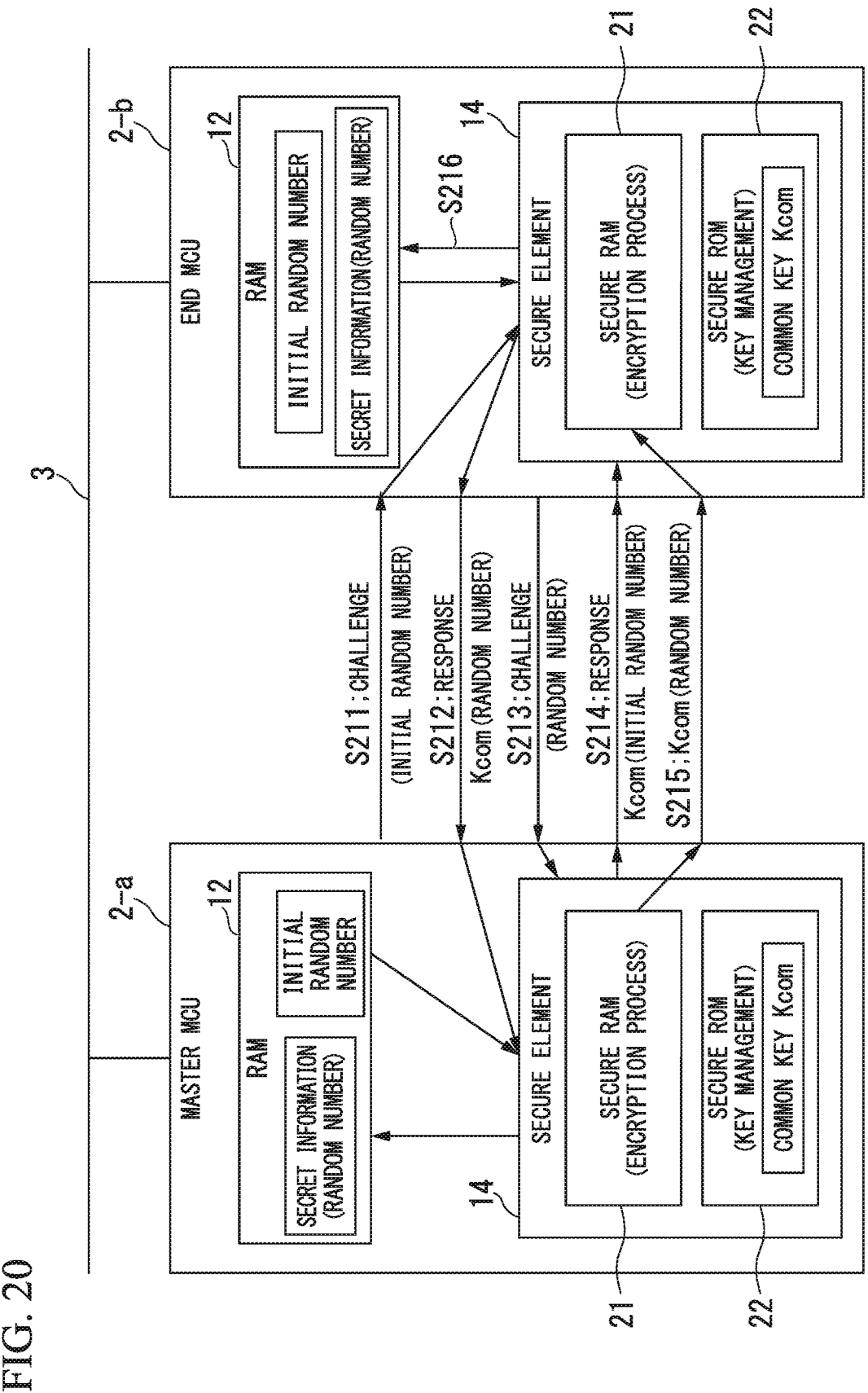
FIG. 20 is a sequence chart of an encryption process according to one embodiment of the present invention.

FIG. 20 is a sequence chart concerning an encryption process according to one embodiment of the present invention. Now, Other Embodiment 2 of encryption processes will be described with reference to FIG. 20. Herein, Other Embodiment 2 of encryption processes is a variation of the second embodiment. Other Embodiment 2 of encryption processes employs a communication network system having the same configuration as the communication network system 1 of FIG. 7 according to the second embodiment; hence, for example, the communication network system is installed in a vehicle. According to Other Embodiment 2 of encryption processes, both the master MCU_2-*a* and the end MCU_2-*b* stores the same common key Kcom in their secure ROM 22.

The process of FIG. 20 is started by a predetermined trigger. The following description refers to the situation of safely notifying random numbers serving as secret information from the master MCU_2-*a* to the end MCU_2-*b*. In this connection, data transmission/reception between the master MCU_2-*a* and the end MCU_2-*b* is carried out through the communication bus 3.

(Step S211)

The master MCU_2-*a* generates and stores an initial random number in its own RAM_12 so as to transmit the initial random number as a challenge to the end MMCU_2-*b*. Additionally, the master MCU_2-*a* transfers the initial random number, i.e. the challenge transmitted to the end MCU_2-*b*, to its own secure element 14.

(Step S212)

The end MCU_2-*b* transfers the initial random number, i.e. the challenge received from the master MCU_2-*a*, to its own secure element 14. The encryption processor 24 of the end MCU_2-*b* encrypts the initial random number by use of the common key Kcom held in its own secure ROM_22. In the encryption process, the secure RAM_21 of the end MCU_2-*b* is used for a temporary storage area of data subjected to the encryption process. Next, the end MCU_2-*b* transmits encryption data Kcom (the initial random nwnher), representing the encrypted initial random number, as a response to the master MCU_2-*a*.

The master MCU_2-*a* transfers the encryption data Kcom (the initial random number), i.e. the response received from the end MCU_2-*b*, to its own secure element 14. The encryption processor 24 of the master MCU_2-*a* decrypts the encryption data Kcom (the initial random number) by use of the common key Kcom held in its own secure ROM 22.

Next, the encryption processor 24 of the master MCU_2-*a* verifies whether decryption data, obtained by decryption, matches the initial random number, i.e. the challenge transmitted to the end MCU_2-*b* in step S211. In the decryption process and the verification process, the secure RAM_21 of the master MCU_2-*a* is used for a temporary storage area of data subject to each of the decryption process and the verification process. Upon successful verification, it is determined that the master MCU_2-*a* has successfully authenticated the end MCU_2-*b*.

Instead of decrypting the encryption data Kcom (the initial random number) serving as the response, the master MCU_2-*a* may encrypt the initial random number, i.e. the challenge transmitted to the end MCU_2-*b* in step S211, by use of the common key Kcom so as to verify whether its encryption data Kcom (the initial random number) matches the encryption data Kcom (the initial random number) serving as the response. In the encryption process and the verification process, the secure RAM_21 of the master MCU_2-*a* is used for a temporary storage area of data subjected to each of the encryption process and the verification process. Upon successful verification, it is determined that the master MCU_2-*a* has successfully authenticated the end MCU_2-*b*.

(Step S213)

The end MCU_2-*b* generates and stores an initial random number held in its own RAM 12 so as to transmit the initial random number as a challenge to the MCU_2-*a*. Additionally, the end MCU_2-*b* transfers the initial random number, i.e. the challenge transmitted to the master MCU_2*a*, to its own secure element 14.

(Step S214)

The master MCU_2-*a* transfers the initial random number, i.e. the challenge received from the end MCU_2-*b*, to its own secure element 14. The encryption processor 24 of the master MCU_2-*a* encrypts the initial random number by use of the common key Kcom held in its own secure ROM_22. In the encryption process, the secure RAM_21 of the master MCU_2-*a* is used for a temporary storage area of data subjected to the encryption process. Next, the master MCU_2-*a* transmits encryption data Kcom (the initial random number), representing the encrypted initial random number, as a response to the end MCU_2-*b*.

The end MCU_2-*b* transfers the encryption data Kcom (the initial random number), i.e. the response received from the master MCU_2-*a*, to its own secure element 14. The encryption processor 24 of the end MCU_2-*b* decrypts the encryption data Kcom (the initial random number) by use of the common key Kcom held in its own secure ROM_22. Next, the encryption processor 24 of the end MCU_2-*b* verifies whether decryption data, obtained by decryption, matches the initial random number serving as the challenge transmitted to the master MCU_2-*a* in step S213. In the decryption process and the verification process, the secure RAM_21 of the end MCU_2-*b* is used for a temporary storage area of data subjected to each of the decryption process and the verification process. Upon successful verification, it is determined that the end MCU_2-*b* has successfully authenticated the master MCU_2-*a*.

Instead of decrypting the encryption data Kcom (the initial random number) serving as the response, the end MCU_2-*b* may encrypt the initial random number, i.e. the challenge transmitted to the master MCU_2-*a* in step S213, by use of the common key Kcom so as to verify whether the encryption data Kcom (the initial random number) matches the encryption data. Kcom (the initial random number) serving as the response. In the encryption process and the verification process, the secure RAM_21 of the end MCU_2-*b* is used for a temporary storage area of data subjected to each of the encryption process and the verification process. Upon successful verification, it is determined that the end MCU_2-*b* has successfully authenticated the master MCU_2-*a*.

Upon success in mutual authentication between the master MCU_2-*a* and the end MCU_2-*b*, a random number serving as secrete information will be transmitted from the master MCU_2-*a* to the end MCU_2-*b*.

(Step S215)

The encryption processor 24 of the master MCU_2-*a* generates a random number serving as secret information so as to encrypt the random number by use of the common key Kcom held in its own secure ROM_22. In the random number generating process and the encryption process, the secure RAM_21 of the master MCU_2-*a* is used for a temporary storage area of data subjected to each of the random number generating process and the encryption process. Next, the master MCU_2-*a* transmits encryption data Kcom (the random number), serving as the encrypted secret information (the random number), to the end MCU_2-*b*.

The end MCU_2-*b* transfers the encryption data Kcom (the random number), received from the master MCU_2-*a*, to its own secure element 14. The encryption processor of the end MCU_2-*b* decrypts the encryption data Kcom (the random number) by use of the common key Kcom held in its own secure ROM_22. In the decryption process, the secure RAM_21 of the end MCU_2-*b* is used for a temporary storage area of data subjected to the decryption process. Owing to the decryption process, it is possible to obtain the random number serving as the secret information from the encryption data Kcom (the random number).

(Step S216)

The end MCU_2-*b* stores the random number, i.e. the secret information obtained by its own secure element 14, in its own RAM 12. The master MCU_2-*a* stores the random number, i.e. the secret information transmitted to the end MCU_2-*b*, in its own RAM 12. Both the master MCU_2-*a* and the end MCU_2-*b* holds the same random number, i.e. the same secret information.

According to Other Embodiment 2 of encryption processes, it is possible to completely carry out an encryption process (i.e. an encryption process or a decryption process) for the information exchanged between multiple units of MCU_2 (i.e. the master MCU_2-*a* and the end MCU_2-*b* in the above example) by way of the encryption process of the secure element 14. Thus, it is possible to ensure safety in the information exchanged between multiple units of MCU_2.

Owing to a challenge-response procedure using encryption processes, it is possible to reliably achieve mutual authentication between the master MCU_2-*a* and the end MCU_2-*b*. This makes it possible to safely transmit secret information from the master MCU_2-*a* to the end MCU_2-*b* by way of encryption processes in communications between the master MCU_2-*a* and the end MCU_2-*b* already subjected to mutual authentication. The secret information can be used as the secret information in the first embodiment. According to Other Embodiment 2 of encryption processes, it is possible to safely transmit random numbers serving as secret information from the master MCU_2-*a* to the end MCU_2-*b*.

[Other Embodiment 3 of Encryption Processes]

Figure 21:
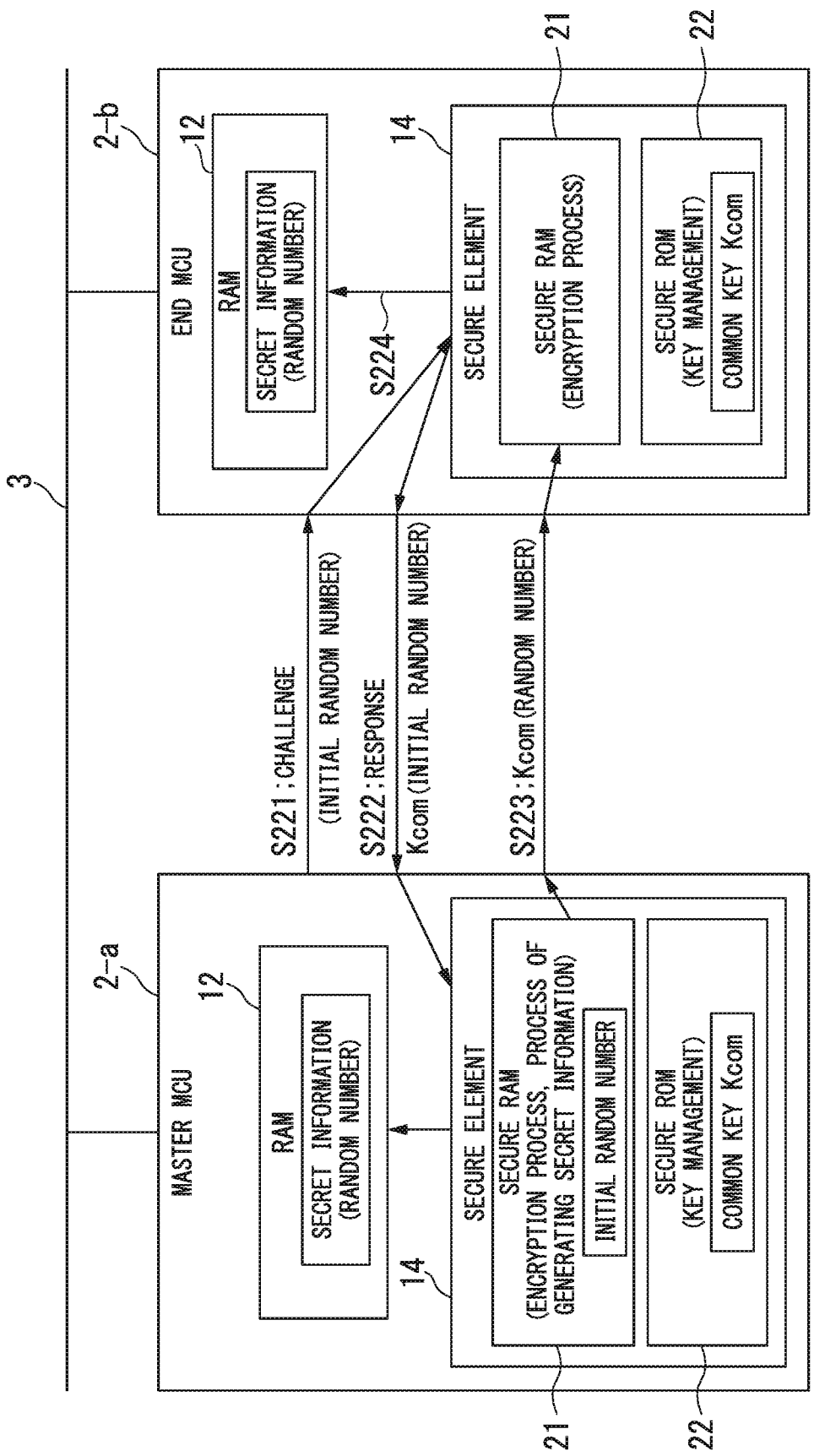
FIG. 21 is a sequence chart of an encryption process according to one embodiment of the present invention.

FIG. 21 is a sequence chart concerning encryption processes according to one embodiment of the present invention. Now, Other Embodiment 3 of encryption processes will be described with reference to FIG. 21. Other Embodiment 3 of encryption processes is a variation of the second embodiment. Other Embodiment 3 of encryption processes employs a communication network system having the same configuration as the communication network system 1 of FIG. 7 according to the second embodiment; hence, for example, the communication network system is installed in a vehicle. In Other Embodiment 3 of encryption processes, both the master MCU_2-*a* and the end MCU_2-*b* store the same common key Kcom with their secure ROM_22. In this connection, common keys can be referred to as symmetrical keys.

The process of FIG. 21 is started at a predetermined trigger. The following description refers to the situation of safely transmitting a random number serving as secret information from the master MCU_2-*a* to the end MCU_2-*b*. In this connection, data transmission/reception is carried out between the master MCU_2-*a* and the end MCU_2*b* through the communication bus 3.

(Step S221)

The encryption processor 24 of the master MCU_2-*a* generates an initial random number.

According to the random number generating process, the secure RAM_21 of the master MCU_2-*a* is used for a temporary storage area of data subjected to the random number generating process. The mater MCU_2-*a* generates and holds the initial random number in the secure RAM_21. The mater MCU_2-*a* transmits a challenge, i.e. the initial random number held in its own secure RAM_21, to the end MCU_2-*b*.

(Step S222)

The end MCU_2-*b* transfers the challenge, i.e. the initial random number received from the master MCU_2-*a*, to its own secure element 14. The encryption processor 24 of the end MCU_2-*b* encrypts the initial random number by use of the common key Kcom held in its own secure ROM_22. In the encryption process, the secure RAM_21 of the end MCU_2-*b* is used for a temporary storage area of data subjected to the encryption process. Next, the end MCU_2-*b* transmits encryption data Kcom (the initial random number), representing the encrypted initial random number, as a response to the master MCU_2-*a*.

(Step S223)

The master MCU_2-*a* transfers the encryption data Kcom (the initial random number), i.e. the response received from the end MCU_2-*b*, to its own secure element 14. The encryption processor 24 of the master MCU_2-*a* decrypts the encryption data Kcom (the initial random number) by use of the common key Kcom held in its own secure ROM 22.

Next, the encryption processor 24 of the master MCU_2-*a* verifies whether decryption data, obtained by decryption, matches the initial random number held in the secure RAM_21 of the master MCU_2-*a*. In the decryption process and the verification process, the secure RAM_21 of the master MCU_2-*a* is used for a temporary storage area of data subjected to each of the decryption process and the verification process. Upon successful verification, it is determined that the master MCU_2-*a* has successfully authenticated the end MCU_2-*b*.

Instead of decrypting the encryption data Kcom (the initial random number) serving as the response, the master MCU_2-*a* encrypts the initial random number held in its own secure RAM_21 by use of the common key Kcom so as to verify whether the encryption data Kcom (the initial random number) with the encryption data Kcom (the initial random number) serving as the response. In the encryption process and the verification process, the secure RAM_21 of the master MCU_2-*a* is used for a temporary storage area of data subjected to each of the encryption process and the verification process. Upon successful verification, it is determined that the master MCU_2-*a* has successfully authenticated the end MCU_2-*b*.

Upon successful verification, the encryption processor 24 of the master MCU_2-*a* generates a random number serving as secret information so as to encrypt the random number by use of the common key Kcom held in its own secure ROM_22. In the random number generating process and the encryption process, the secure RAM_21 of the master MCU_2-*a* is used for a temporary storage area of data subjected to each of the random number generating process and the encryption process. Next, the master MCU_2-*a* transmits encryption data Kcom (the random number), representing the encrypted secret information (i.e. the random number), to the end MCU_2-*b*.

The end MCU_2-*b* transfers the encryption data Kcom (the random number), received from the master MCU_2-*a*, to its own secure element 14. The encryption processor 24 of the end MCU_2-*b* decrypts the encryption data Kcom (the random number) by use of the common key Kcom held in its own secure ROM_22. In the decryption process, the secure RAM_21 of the end MCU_2-*b* is used for a temporary storage area of data subjected to the decryption process. According to the decryption process, it is possible to obtain the random number serving as the secret information from the encryption data Kcom (the random number).

(Step S224)

The end MCU_2-*b* stores the random number, i.e. the secret information obtained by its own secure element 14, in its own RAM 12. The master MCU_2-*a* stores the random number, i.e. the secret information transmitted to the end MCU_2-*b*, in its own RAM 12. Thus, both the master MCU_2-*a* and the end MCU_2-*b* hold the same random number, i.e. the same secret information.

According to Other Embodiment 3 of encryption processes, it is possible to safely carry out an encryption process (i.e. an encryption process or a decryption process) for the information exchanged between multiple units of MCU_2 (i.e. the master MCU_2-*a* and the end MCU_2-*b* in the above example) by way of the encryption process of the secure element 14. Thus, it is possible to ensure safety in the information exchanged between multiple units of MCU_2.

According to a challenge-response procedure using encryption processes, it is possible for the master MCU_2-*a* to reliably authenticate the end MCU_2-*b*. This makes it possible to safely transmit secret information from the master MCU_2-*a* to the end MCU_2-*b* by way of encryption processes. The secret information can be used for secret information in the first embodiment. According to Other Embodiment 3 of encryption processes, it is possible to safely transmit random numbers serving as secret information from the master MCU_2-*a* to the end MCU_2-*b*.

Similar to Other Embodiment 2 of encryption processes, Other Embodiment 3 of encryption processes allows for mutual authentication between the master MCU_2-*a* and the end MCU_2-*b*, and therefore, upon success in mutual authentication, it is possible to transmit random numbers serving as secret information from the master MCU_2-*a* to the end MCU_2-*b*.

[Other Embodiment of MAC Generating Process and MAC Checking Process]

Figure 22:
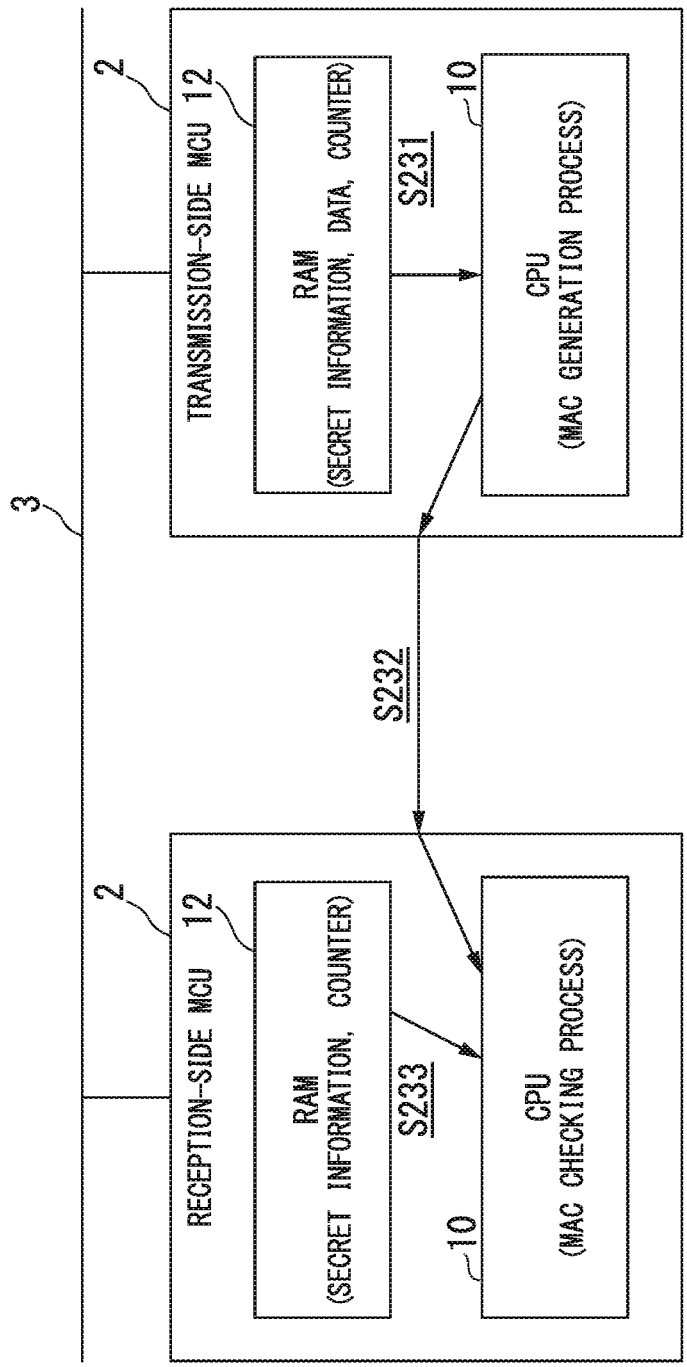
FIG. 22 is a sequence chart used to explain a MAC generating process and a MAC checking process according to one embodiment of the present invention.

FIG. 22 is a sequence chart used to explain the MAC generating process and the MAC checking process according to one embodiment of the present invention.

Now, Other Embodiment of MAC generating process and MAC checking process will be described with reference to FIG. 22. Other Embodiment of MAC generating process and MAC checking process is a variation of the second embodiment. Other Embodiment of MAC generating process and MAC checking process employs a communication network system having the same configuration as the communication network system 1 of FIG. 7 according to the second embodiment; hence, for example, the communication network system is installed in a vehicle. In Other Embodiment of MAC generating process and MAC checking process, the master MCU_2-*a* safely transmits random numbers serving as secret information to the already-authenticated MCU_2-*b* by way of any one of encryption processes according to Embodiments 1, 2, 3. Both the master MCU_2-*a* and the end MCU_2-*b* store random numbers serving as secret information with their RAM 12. The RAM 12 serving as the secret information storage unit 117 according to the first embodiment holds random numbers serving as secret information.

In FIG. 22, the transmission-side MCU_2 operates as a transmission node. The transmission-side MCU_2 may be either the master MCU_2-*a* or the end MCU_2-*b*. The reception-side MCU_2 operates as a reception node. The reception-side MCU_2 may be either the master MCU_2-*a* or the end MCU_2-*b*. The transmission-side MCU_2 holds secret information, transmission data, and its transmission count value in the RAM_12. The reception-side MCU_2 holds secret information and a reception count value in the RAM_12. The process of FIG. 22 is started upon generating a CAN frame being transmitted by the transmission-side MCU_2.

(Step S231)

The CPU_10 of the transmission-side MCU_2 generates MAC by use of secret information, transmission data, and its transmission count value held in the RAM 12. The MAC generating method is identical to the foregoing one according to the first embodiment.

(Step S232)

The CPU_10 of the transmission-side MCU_2 transmits onto the communication bus 3 the CAN frame including the transmission data used to generate MAC in step S231 and the MAC generated in step S231. The CAN frame is received by the reception-side MCU_2 through the communication bus 3.

(Step S233)

The CPU 10 of the reception-side MCU_2 holds the CAN frame, received through the communication bus 3, in the RAM_12. The CPU_10 of the reception-side MCU_2 obtains reception data and received MAC from the CAN frame held in xe RAM_12. Additionally, the CPU_10 of the reception-side MCU_2 reads from the RAM 12 a reception count value associated to ID stored in an ID section of the CAN frame held in the RAM_12. Moreover, the CPU_10 of the reception-side MCU_2 reads secret information from the RAM_12.

Next, the CPU_10 of the reception-side MCU_2 generates C by use of the secret information, the reception data, and the reception count value. The MAC generating method is identical to the foregoing one of the transmission-side MCU_2. Next, the CPU_10 of the reception-side MCU_2 determines whether the MAC matches the received MAC retrieved from the CAN frame held in the RAM_12. When the determination result indicates unmatched, the reception-side MCU_2 carries out rechecking in a similar manner of the first embodiment.

According to Other Embodiment of MAC generating process and MAC checking process, the CPU_10 carries out a MAC generating process and a MAC checking process by use of the secret information held in the RAM 12. This indicates a possibility of reducing the processing time with respect to the MAC generating process and the MAC checking process.

The second embodiment shown in FIG. 10 is designed to hold secret information in the secure RAM_21 of the secure element 14 so as to carry out a MAC generating process and a MAC checking process with the secure element 14. For this reason, for example, the CPU_10 needs to transfer transmission data and its transmission count value so as to receive MAC generated by the secure element 14 every time it transmits a CAN frame.

It takes a redundant time to carry out data exchange between the CPU_10 and the secure element 14, which in turn causes an overhead in the MAC generating process. This problem may occur in the MAC checking process as well. According to Other Embodiment of MAC generating process and MAC checking process, however, the CPU_10 is solely used to carry out a MAC generating process and a MAC checking process; this does not cause any data exchange between the CPU_10 and the secure element 14; hence, it is possible to reduce a redundant time due to overhead.

It is possible to store computer programs, used to implement the foregoing function of MCU_2, in computer-readable storage media, wherein a computer may load and executes programs stored in storage media.

Herein, the term "computer-readable storage media" may refer to flexible disks, magneto-optic disks, ROM, non-volatile writable memory such as flash memory, portable media such as DVD (Digital Versatile Disk), and storage units such as hard disks installed in computers.

Additionally, the term "computer-readable storage media" may embrace any measures able to hold programs for a certain time such as volatile memory (e.g. DRAM (Dynamic Random Access Memory)) installed in computers acting as servers or clients upon receiving programs transmitted through networks such as the Internet, telephone lines, communication lines, and so on.

The foregoing programs may be transmitted from computers, having storage units configured to store programs, through transmission media or via transmission waves propagating through transmission media. Herein, the term "transmission media" configured to transmit programs may refer to any media having information transmitting functions, e.g. networks (communication networks) such as the Internet, telephone lines, communication lines, and so on.

Moreover, the foregoing programs may be produced as differential files (differential programs) which can be combined with other programs pre-installed in computers so as to achieve the foregoing functions.

REFERENCE SIGNS LIST

1 communication network system
2, 2-*a*, 2*b* MCU
3 communication bus
10 CPU
11 flash memory
12 RAM
13 bootloader
14 secure element
21 secure RAM
22 secure ROM
23 verifier
24 encryption processor
111 transmitter
112 receiver
113 frame reception processor
114 MAC (message authentication code) generator
115 counter
116 MAC (message authentication code) checking part
117 secret information storage unit

The invention claimed is:

1. A communication network system connecting a plurality of micro-computing units, each of which comprises a transmitter, a receiver, a counter circuit, a message authentication code generator circuit, a message authentication code checking part, and a storage circuit configured to store secret information shared by the plurality of micro-computing units, wherein according to the micro-computing unit serving as a transmission node, the counter circuit holds a transmission count value being incremented upon transmitting each message, the message authentication code generator circuit generates a first message authentication code based on transmission data included in a transmitting message, the transmission count value, and the secret information such that the first message authentication code includes a predetermined number of sections each configured of a predetermined number of bits, and the transmitter transmits the transmitting message including the transmission data and an extracted part corresponding to a section of the first message authentication code specified by the transmission count value, and wherein according to the micro-computing unit serving as a reception node, the receiver receives a message from the transmitter, the counter circuit holds a reception count value being incremented upon receiving each message, and the message authentication code checking part generates a second message authentication code based on reception data obtained from the received message of the receiver, the reception count value, and the secret information such that the second message authentication code includes a predetermined number of sections each configured of the predetermined number of bits, thus checking whether the extracted part of the first message authentication code matches a checking part corresponding to a section of the second message authentication code specified by the reception count value, thus authenticating the received message.

2. The communication network system according to claim 1, wherein according to the micro-computing unit serving as the transmission node, the message authentication code generator circuit extracts an upper bit string from the transmission count value so as to use the upper bit string for generating the first the message authentication code, and thereby the transmitter transmits the transmitting message including the extracted part of the first message authentication code specified by a lower bit string of the transmission count value, and wherein according to the micro-computing unit serving as the reception node, the message authentication code checking part extracts an upper bit string from the reception count value so as to use the upper bit string for generating the second message authentication code, and thereby the message authentication code checking part selects the checking part of the second message authentication code specified by a lower bit string of the reception count value so as to determine whether the extracted part of the first message authentication code matches the checking part of the second message authentication code.

3. The communication network system according to claim 2, wherein when the message authentication code checking part fails to determine that the extracted part of the first message authentication code matches checking part of the second message authentication code, the message authentication code checking part selects a next checking part of the second message authentication code specified by a next value which is produced by incrementing the lower bit string of the second message authentication code and thereby rechecks whether the extracted part of the first message authentication code matches the next checking part of the second message authentication code.

4. The communication network system according to claim 3, wherein when the message authentication code checking part successfully determines that the extracted part of the first message authentication code matches the next checking part of the second message authentication code via rechecking, the counter circuit sets the next value to the lower bit string of the reception count value being held thereby.

5. The communication network system according to claim 1, wherein according to the micro-computing unit serving as the transmission node, the message authentication code generator circuit extracts an upper bit string from the transmission count value so as to use the upper bit string for generating the first message authentication code, and thereby the transmitter transmits the transmitting message including the extracted part of the first message authentication code specified by a lower bit string of the transmission count value and positional information representing the section as the extracted part of the first message authentication code specified by a lower bit string of the transmission count value, and wherein according to the micro-computing unit serving as the reception node, the message authentication code checking part extracts an upper bit string from the reception count value so as to use the upper bit string for generating the second message authentication code, and thereby the message authentication code checking part checks whether the extracted part of the first message authentication code specified by the positional information in the received message of the receiver matches the checking part of the second message authentication code specified by a lower bit string of the reception count value.

6. The communication network system according to claim 1, wherein the transmission count value includes an upper bit string and a lower bit string, and wherein the message authentication code generator extracts a predetermined number of bits from the lower bit string of the transmission count value, and stores the extracted predetermined number of bits in an error correcting field of a controller area network frame.

7. The communication network system according to claim 6, wherein the reception count value includes an upper bit string and a lower bit string, and wherein the message authentication code checking part further determines whether checking bits in the lower bit string of the reception count value matches with the predetermined number of bits from the lower bit string of the transmission count value stored in the error correcting field of the controller area network frame.

8. The communication network system according to claim 1, wherein the transmission count value includes an upper bit string and a lower bit string, wherein the extracted part of the first message authentication code is specified by the lower bit string of the transmission count value, and wherein the extracted part of the first message authentication code and corresponding position information are stored in an error correcting field of a controller area network frame.

9. The communication network system according to claim 1,
wherein the reception count value includes an upper bit string and a lower bit string, and
wherein the message authentication code checking part further determines whether a checking value specified in the lower bit string of the reception count value matches with a value extracted from an error correcting field of a controller area network frame.

10. A transmission node serving as a micro-computing unit among a plurality of micro-computing units connected together in a communication network system, comprising:
a secret information storage circuit configured to store secret information shared by the plurality of micro-computing units;
a transmission counter circuit configured to hold a transmission count value being incremented for transmitting each message;
a message authentication code generator circuit configured to extract an upper bit string from the transmission count value to thereby generate a message authentication code based on transmission data included in a transmitting message, the upper bit string of the transmission count value, and the secret information such that the message authentication code includes a predetermined number of sections each configured of a predetermined number of bits; and
a transmitter configured to transmit the transmitting message including the transmission data and an extracted part corresponding to a section of the message authentication code specified by a lower bit string of the transmission count value,
wherein the extracted part of the message authentication code is checked with a checking part of another message authentication code at a reception node.

11. A reception node serving as a micro-computing unit among a plurality of micro-computing units connected together in a communication network system, comprising:
a secret information storage circuit configured to store secret information shared by the plurality of micro-computing units;
a reception counter circuit configured to hold a reception count value being incremented for receiving each message;
a receiver configured to receive a message; and
a message authentication code checking part configured to extract an upper bit string from the reception count value to thereby generate a message authentication code based on reception data, obtained from the received message of the receiver, the upper bit string of the reception count value, and the secret information such that the message authentication code includes a predetermined number of sections each configured of a predetermined number of bits, thus checking whether a checking part of the message authentication code specified by a lower bit string of the reception count value matches an extracted part of another message authentication code obtained from the received message of the receiver.

12. A message checking method adapted to a communication network system connecting a plurality of micro-computing units sharing secret information, serving as a transmission node and a reception node, comprising:

holding, by the transmission node, a transmission count value being incremented for transmitting each message;
extracting an upper bit string from the transmission count value;
generating, by the transmission node, a first message authentication code based on transmission data included in a transmitting message, the upper bit string of the transmission count value, and the secret information such that the first message authentication code includes a predetermined number of sections each configured of a predetermined number of bits;
transmitting, by the transmission node, the transmitting message including the transmission data and an extracted part corresponding to a section of the first message authentication code specified by a lower bit string of the transmission count value;
receiving, by the reception node, a message;
holding, by the reception node, a reception count value being incremented for receiving each message;
extracting an upper bit string from the reception count value;
generating, by the reception node, a second message authentication code based on reception data obtained from the received message, the upper bit string of the reception count value, and the secret information such that the second message authentication code includes a predetermined number of sections each configured of a predetermined number of bits;
specifying a checking part corresponding to a section of the second message authentication code by a lower bit string of the reception count value; and
checking whether the extracted part of the first message authentication code matches the checking part of the second message authentication code.

13. A non-transitory computer-readable storage medium having stored therein a computer program causing a computer of a transmission node serving as a micro-computing unit among a plurality of micro-computing units sharing secret information, in a communication network system to implement processes including:
holding a transmission count value being incremented for transmitting each message;
extracting an upper bit string from the transmission count value;
generating a message authentication code based on transmission data included in a transmitting message, the upper bit string of the transmission count value, and the secret information such that the message authentication code includes a predetermined number of sections each configured of a predetermined number of bits; and
transmitting the transmitting message including the transmission data and an extracted part corresponding to a section of the message authentication code specified by a lower bit string,
wherein the extracted part of the message authentication code is checked with a checking part of another message authentication code at a reception node.

14. A non-transitory computer-readable storage medium having stored therein a computer program causing a computer of a reception node serving as a micro-computing unit among a plurality of micro-computing units sharing secret information, in a communication network system to implement processes including:
receiving a message;
holding a reception count value being incremented for receiving each message;

extracting an upper bit string from the reception count value;

generating a message authentication code based on reception data obtained from the received message, the upper bit string of the reception count value, and the secret information such that the message authentication code includes a predetermined number of sections each configured of a predetermined number of bits;

specifying a checking part of the message authentication code subjected to checking by a lower bit string of the reception count value; and checking whether the checking part of the message authentication code matches an extracted part of another message authentication code obtained from the received message.

* * * * *

UNITED STATES PATENT AND TRADEMARK OFFICE
CERTIFICATE OF CORRECTION

PATENT NO. : 10,681,540 B2
APPLICATION NO. : 15/315084
DATED : June 9, 2020
INVENTOR(S) : K. Takemori et al.

Page 1 of 1

It is certified that error appears in the above-identified patent and that said Letters Patent is hereby corrected as shown below:

On the Title Page

Other Publications, page 2, Column 2, Line 41, please change "No. 525" to -- No. 225 --
Other Publications, page 2, Column 2, Line 45, please change "Danies" to -- Davies --
Other Publications, page 2, Column 2, Line 47, please change "Enlgish" to -- English --

In the Claims

Column 31, Line 67 (Claim 3, Line 4), please change "matches checking" to -- matches the checking --

Signed and Sealed this
Twenty-fourth Day of November, 2020

Andrei Iancu
*Director of the United States Patent and Trademark Office*